US008856532B2

(12) United States Patent
Boyer et al.

(10) Patent No.: US 8,856,532 B2
(45) Date of Patent: Oct. 7, 2014

(54) DIGITAL SIGNATURES OF COMPOSITE RESOURCE DOCUMENTS

(75) Inventors: John M. Boyer, Victoria (CA); Ragunathan Mariappan, Bangalore (IN); Nazeer S. Unnisa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 13/168,272

(22) Filed: Jun. 24, 2011

(65) Prior Publication Data

US 2012/0089841 A1 Apr. 12, 2012

(30) Foreign Application Priority Data

Oct. 6, 2010 (CA) ...................................... 2716982

(51) Int. Cl.
*H04L 9/32* (2006.01)
*H04L 9/06* (2006.01)
(52) U.S. Cl.
CPC ............ *H04L 9/3247* (2013.01); *H04L 9/0643* (2013.01); *H04N 2201/3235* (2013.01)
USPC ........... 713/175; 713/176; 717/173; 707/690; 707/698; 707/E17.005
(58) Field of Classification Search
CPC ............... H04L 9/3247; H04L 9/0643; H04M 2215/0156; H04N 2201/3235
USPC ........................................................ 713/175
See application file for complete search history.

(56) References Cited

U.S. PATENT DOCUMENTS

| 7,657,580 B2* | 2/2010 | Choquier et al. ............. 709/226 |
| 2004/0148508 A1 | 7/2004 | Alev et al. |
| 2006/0048129 A1* | 3/2006 | Napier et al. ................. 717/168 |
| 2006/0112152 A1* | 5/2006 | Napier et al. ................. 707/203 |
| 2006/0253439 A1 | 11/2006 | Ren et al. |
| 2010/0037062 A1 | 2/2010 | Carney |
| 2010/0185866 A1* | 7/2010 | Wang et al. ................... 713/176 |
| 2010/0299315 A1* | 11/2010 | Gosnell ......................... 707/690 |
| 2014/0033193 A1* | 1/2014 | Palaniappan .................. 717/173 |

FOREIGN PATENT DOCUMENTS

| CN | 101369889 A | 11/2006 |
| CN | 101072097 A | 11/2007 |

OTHER PUBLICATIONS

Google prior art search.*
Google Patent Search.*
Bartel, Mark, et al. "XML-Signature Syntax and Processing." Jun. 10, 2008. <www.w3.org/TR/2008/REC-xmldsig-core-20080610>.

* cited by examiner

*Primary Examiner* — Arvin Eskandarnia
(74) *Attorney, Agent, or Firm* — Patents on Demand P.A.; Brian K. Buchheit; Scott M. Garrett

(57) ABSTRACT

An embodiment of the disclosure can receive a composite resource document containing at least one resource. An updated manifest resource can be obtained. The updated manifest resource can list all resources in the composite resource document. A set of zero or more (0 . . . N) resources can be indicated. Each indicated resource is one that is to be subtracted from the list of resources in the updated manifest resource in order to create a generated signature reference list of identified resources to be signed. A hash token can be generated using the resources identified in the generated signature reference list to form a signature hash token. The signature hash token can be encrypted with a secret key.

20 Claims, 23 Drawing Sheets

Composite document system
500

Composite document system
500

```
<?xml version="1.0" encoding="UTF-8"?>
<manifest:manifest xmlns:manifest="urn:oasis:names:tc:opendocument:xmlns:manifest:1.0">
    <manifest:file-entry manifest:full-path="loan1.xhtml" manifest:media-type="text/html" manifest:size=""/>
    <manifest:file-entry manifest:full-path="loan2.xhtml" manifest:media-type="text/html" manifest:size=""/>
    <manifest:file-entry manifest:full-path="/" manifest:media-type="application/vnd.ibm.iwd" manifest:size=""/>
    <manifest:file-entry manifest:full-path="loanInstance.xml" manifest:media-type="application/xml" manifest:size=""/>
    <manifest:file-entry manifest:full-path="style/gen_default-xml.css" manifest:media-type="text/css" manifest:size=""/>
    <manifest:file-entry manifest:full-path="format.js" manifest:media-type="text/plain" manifest:size=""/>
    <manifest:file-entry manifest:full-path="index.xml" manifest:media-type="application/xml" manifest:size=""/>
    <manifest:file-entry manifest:full-path="content.xml" manifest:media-type="text/xml" manifest:size=""/>
    <manifest:file-entry manifest:full-path="style/gen_default.css" manifest:media-type="text/css" manifest:size=""/>
    <manifest:file-entry manifest:full-path="thanks.html" manifest:media-type="text/html" manifest:size=""/>
    <manifest:file-entry manifest:full-path="loan3.xhtml" manifest:media-type="text/html" manifest:size=""/>
</manifest:manifest>
```

```
<?xml version="1.0" encoding="UTF-8"?>
<LoanRecord xmlns="">
    <StartDate></StartDate>
    <Borrower>
        <Name></Name>
        <Addr></Addr>
    </Borrower>
    <Principal currency="USD"></Principal>
    <Duration></Duration>
    <InterestRate></InterestRate>
    <Monthly-Payment></Monthly-Payment>
    <TotalPayout></TotalPayout>
    <ds:Signature xmlns:ds="http://www.w3.org/2000/09/xmldsig#" Id="firstSigner">
        <ds:SignedInfo>
            <ds:CanonicalizationMethod Algorithm="http://www.w3.org/TR/2001/REC-xml-c14n-20010315"/>
            <ds:SignatureMethod Algorithm="http://www.w3.org/2000/09/xmldsig#rsa-sha1"></ds:SignatureMethod>
        </ds:SignedInfo>
        <ds:SignatureValue></ds:SignatureValue>
    </ds:Signature>
</LoanRecord>
```

```xml
<?xml version="1.0" encoding="UTF-8"?>
<LoanRecord xmlns="">
    <StartDate>2010-02-05</StartDate>
    <Borrower>
        <Name>John Q. Public</Name>
        <Addr>123 Main St. Tinyville</Addr>
    </Borrower>
    <Principal currency="USD">10000</Principal>
    <Duration>12</Duration>
    <InterestRate>5</InterestRate>
    <Monthly-Payment>856.07</Monthly-Payment>
    <TotalPayout>10272.84</TotalPayout>
    <ds:Signature xmlns:ds="http://www.w3.org/2000/09/xmldsig#" Id="firstSigner">
        <ds:SignedInfo>
            <ds:CanonicalizationMethod Algorithm="http://www.w3.org/TR/2001/REC-xml-c14n-20010315"/>
            <ds:SignatureMethod Algorithm="http://www.w3.org/2000/09/xmldsig#rsa-sha1"></ds:SignatureMethod>
        </ds:SignedInfo>
        <ds:SignatureValue></ds:SignatureValue>
    </ds:Signature>
</LoanRecord>
```

```xml
<?xml version="1.0" encoding="UTF-8"?>
<LoanRecord>                                                                    1200
        <StartDate>2010-02-05</StartDate>
        <Borrower>
                <Name>John Q. Public</Name>
                <Addr>123 Main St. Tinyville</Addr>
        </Borrower>
        <Principal currency="USD">10000</Principal>
        <Duration>12</Duration>
        <InterestRate>5</InterestRate>
        <Monthly-Payment>856.07</Monthly-Payment>
        <TotalPayout>10272.84</TotalPayout>
                <ds:Signature xmlns:ds="http://www.w3.org/2000/09/xmldsig#" Id="firstSigner">
                        <ds:SignedInfo>
                                <ds:CanonicalizationMethod Algorithm="http://www.w3.org/TR/2001/REC-
xml-c14n-20010315"/>
                                <ds:SignatureMethod Algorithm="http://www.w3.org/2000/09/xmldsig#rsa-sha1"/>
    1202    ───►                 <ds:Reference URI="">
                                        <ds:Transforms>
                                                <ds:Transform Algorithm="
http://www.w3.org/2000/09/xmldsig#enveloped-signature"/>
                                        </ds:Transforms>
                                        <ds:DigestMethod Algorithm="http://www.w3.org/2000/09/xmldsig#sha1"/>
                                        <ds:DigestValue>BGl5PqfvbprSPx722NN+dtFiedg=</ds:DigestValue>
                                </ds:Reference>
    1204    ───►                 <ds:Reference URI="loan2.xhtml">
                                        <ds:DigestMethod Algorithm="http://www.w3.org/2000/09/xmldsig#sha1"/>
                                        <ds:DigestValue>Zd7bm6C83XCpLVsulr9SsBY6XDA=</ds:DigestValue>
                                </ds:Reference>
    1206    ───►                 <ds:Reference URI="loan1.xhtml">
                                        <ds:DigestMethod Algorithm="http://www.w3.org/2000/09/xmldsig#sha1"/>
                                        <ds:DigestValue>S6K51SCPBQ+zMElbYF0QxZy1BSs=</ds:DigestValue>
                                </ds:Reference>
    1208    ───►                 <ds:Reference URI="style/gen_default-xml.css">
                                        <ds:DigestMethod Algorithm="http://www.w3.org/2000/09/xmldsig#sha1"/>
                                        <ds:DigestValue>4ctREhVfB2NXmkq5XRBHkQxtbko=</ds:DigestValue>
                                </ds:Reference>
                                <ds:Reference URI="format.js">
                                        <ds:DigestMethod Algorithm="http://www.w3.org/2000/09/xmldsig#sha1"/>
                                        <ds:DigestValue>pXqx8vo49YqF7rpvNjqV2j7Tfb8=</ds:DigestValue>
                                </ds:Reference>
                                <ds:Reference URI="index.xml">
                                        <ds:DigestMethod Algorithm="http://www.w3.org/2000/09/xmldsig#sha1"/>
                                        <ds:DigestValue>KMf9kdICiohIwaHnFbdJmY9iFrU=</ds:DigestValue>
                                </ds:Reference>
                                <ds:Reference URI="style/gen_default.css">
                                        <ds:DigestMethod Algorithm="http://www.w3.org/2000/09/xmldsig#sha1"/>
                                        <ds:DigestValue>kGDIWhM8Hy/3WGqRC56Wi26bRkI=</ds:DigestValue>
                                </ds:Reference>
```

FIG. 12 cont.

```
            <ds:Reference URI="thanks.html">
                <ds:DigestMethod Algorithm="http://www.w3.org/2000/09/xmldsig#sha1"/>
                <ds:DigestValue>EpQ0Ux5K6Jagx1Xfoe6j8NBdi0E=</ds:DigestValue>
            </ds:Reference>
            <ds:Reference URI="loan3.xhtml">
                <ds:DigestMethod Algorithm="http://www.w3.org/2000/09/xmldsig#sha1"/>
                <ds:DigestValue>vUVIBA01C8EsVCTVcWMqpwEI0z8=</ds:DigestValue>
            </ds:Reference>
 1210 ——▶   <ds:Reference URI="META-INF/manifest.xml">
                <ds:DigestMethod Algorithm="http://www.w3.org/2000/09/xmldsig#sha1"/>
                <ds:DigestValue>VC01CTVcWMqpwEI0vUVIBA8Esz8=</ds:DigestValue>
            </ds:Reference>
1212 ——▶  </ds:SignedInfo>
        <ds:SignatureValue>VzXZ9M62HrRZCNtrLG22rewLPozjGKS+KPgot44r1VIMijo3PTIEARbDfLJxPih5V/
xH4 RqDxNuq8lm1rMDLbTbkFaN2bVfDzOOGqPyXmxtABYw+IqOY+aV27LGyskz5IbA9SnCSEu35O
GTxqPLGtLkK41gTP2unBoGrMB4A=</ds:SignatureValue>
            <ds:KeyInfo>
                <ds:X509Data>
<ds:X509SubjectName>1.2.840.113549.1.9.1=#1615726167756e617468616e40696e2e69626d2e636f6d,UID=
011763744,CN=RA GUNATHAN MARIAPPAN,O=International Business Machines Corp.
<ds:X509SubjectName>
<ds:X509Certificate>MIIFZzCCBNCgAwIBAgIQVHEd47MEr6CCIN78LXK2QDANBgkqhkiG9w0BAQUFADCB+
TELMAkGA1UE
BhMCVVMxNDAyBgNVBAoTK0ludGVybmF0aW9uYWwgQnVzaW5lc3MgTWFjaGluZXMgQ29ycG9yYXRp
b24xHzAdBgNVBAsTFlZlcmlTaWduIFRydXN0XN0IE5ldHdvcmsxOzA5BgNVBAsTMIRlcm1zIG9mIHVz
ZSBhdCBodHRwczovL3d3dy52ZXJpcc2Inbi5jb20vcnBhIChjKTAzMTAwLgYDVQQLEydDbGFzcyAy
IE9uU2I0ZSBJbmRpdmlkdWFsIFN1YnNjcmliZXIgQ0ExDAiBgNVBAMTG0ICTSBDZXJ0aWZpY2F0
aW9uIEF1dGhvcml0eTAeFw0wOTA1MTUwMDAwMDBaFw0xMDA1MTUyMzU5NTlaMIGQMS4wLAYDVQQK
FCVJbnRlcm5hdGlvbmFsIEJ1c2luZXNzIE1hY2hpbmVzIENvcnAuMR0wGwYDVQQDDBRSQUdVTkFU
SEFOIE1BUklBUFBBTjEZMBcGCgmSJomT8ixkAQEUCTAxMTc2Mzc0NDEkMCIGCSqGSIb3DQEJARYV
cmFndW5hdGhhbkBpbi5pYm0uY29tMIGfMA0GCSqGSIb3DQEBAQUAA4GNADCBiQKBgQDnIKJtMbKo
iaYtI5LOolbvzJJkvNBLacNkTGR/X3trDrwrBWL3BwhOghFbJ7yOWumC5ck4hl84Ja8jvPDz5VJL
N92e6ggppHJxoY0UPi1Yk/mAOSpHVpjZRroy8XIrF9q3uFcHqjc727HtZoQnRhcecTe5NdMnNveh
SVc8eKo8gwIDAQABo4ICVTCCAIEwCQYDVR0TBAIwADALBgNVHQ8EBAMCBaAwZgYDVR0fBF8wXTBb
oFmgV4ZVaHR0cDovL29uc2l0ZWNybC52ZXJpcc2Inbi5jb20vSW50ZXJuYXRpb25hbEJ1c2luZXNz
TWFjaGluZXNDb3JwQ29ycG9yYXRIQ0IPL0xhdGVzdENSTDCCASkGA1UdIASCASAwggEcMIIBGAYL
YIZIAYb4RQEHFwIwggEHMCsGCCsGAQUFBwIBFh9odHRwczovL3d3dy52ZXJpcc2Inbi5jb20vcnBh
LWtyMIHXBggrBgEFBQcCAjCByhqBx05vdGljZSBUZXh0OPU5PVEIDRTogUHJpdmF0ZSBrZXkgbWF5
IGJIIHJIY292ZXJIZCBieSBWZXJpU2InbidzIGN1c3RvbWVyIHdobyBtYXkgYWJsZSB0byBk
ZWNyeXB0IG1lc3NhZ2VzIHlvdSBzZW5kIHRvIGNlcnRpZmljYXRIIGhvbGRlci4gIFVzZSBpcyBz
dWJqZWN0IHRvIHRoZSBicm1zIGF0IGh0dHBzOi8vd3d3LnZlcmlzaWduLmNvbS9ycGEuIwHwYDVR0j
BBgwFoAUkcFzsHPV2ZJ0Z80b8VEUNDG2LFowHQYDVR0OBBYEFlkaqQSDKLnKCxboyANu4XAPqZ8w
MDAGA1UdEQQpMCegJQYKKwYBBAGCNxQCA6AXDBVyYWd1bmF0aGFuQGluLmlibS5jb20wHQYDVR0l
BBYwFAYIKwYBBQUHAwIGCCsGAQUFBwMEMBEGCWCGSAGG+EIBAQQEAwIFoDANBgkqhkiG9w0BAQU
F AAOBgQBudtgvOIh0SIGYLBps31QEDA7enzdnAtwAYidjk3RP0psJEqJZmUuJbuaV67cmmEDP1qnV
1nqfd+S2LMMk7RWrH32SQKuInTtpIBF1YGPslclrNgjOCgZQRWotXXua5ncdf0AsckE/GizW7VBB
2Vi3pnePMXxUAHOx1XWmHscs3g==</ds:X509Certificate>
Time)</TimeLocal>
```

FIG. 12 cont.

```
                </ds:X509Data>
            </ds:KeyInfo>
            <ds:Object>
                <ds:SignatureProperties>
                    <ds:SignatureProperty Target="firstSigner">
                        <TimeLocal>Fri Jan 29 2010 15:46:01 GMT+0530 (India Standard
<TimeUTC>Fri, 29 Jan 2010 10:16:01 GMT</TimeUTC>
                        <Locale>en_US</Locale>
                    </ds:SignatureProperty>
                </ds:SignatureProperties>
            </ds:Object>
        </ds:Signature>
</LoanRecord>
```

```xml
<?xml version="1.0" encoding="UTF-8"?>
<LoanRecord>
        <StartDate>2010-02-05</StartDate>
        <Borrower>
                <Name>John Q. Public</Name>
                <Addr>123 Main St. Tinyville</Addr>                    1300
        </Borrower>
        <Principal currency="USD">10000</Principal>
        <Duration>12</Duration>
        <InterestRate>5</InterestRate>                                 1302
        <Monthly-Payment>856.07</Monthly-Payment>
        <TotalPayout>10272.84</TotalPayout>
        <ds:Signature xmlns:ds="http://www.w3.org/2000/09/xmldsig#" Id="firstSigner">
                <ds:SignedInfo>
        <ds:CanonicalizationMethod Algorithm="http://www.w3.org/TR/2001/REC-xml-c14n-20010315"/>
        <ds:SignatureMethod Algorithm="http://www.w3.org/2000/09/xmldsig#rsa-sha1"/>
        <ds:Reference URI="">              ←——— 1304
                <ds:Transforms>
                <ds:Transform Algorithm="http://www.w3.org/2000/09/xmldsig#enveloped-signature"/>
                </ds:Transforms>
                <ds:DigestMethod Algorithm="http://www.w3.org/2000/09/xmldsig#sha1"/>
                <ds:DigestValue></ds:DigestValue>
        </ds:Reference>
        <ds:Reference URI="loan2.xhtml">
                <ds:DigestMethod Algorithm="http://www.w3.org/2000/09/xmldsig#sha1"/>
                <ds:DigestValue></ds:DigestValue>
        </ds:Reference>
        <ds:Reference URI="loan1.xhtml">
                <ds:DigestMethod Algorithm="http://www.w3.org/2000/09/xmldsig#sha1"/>
                <ds:DigestValue></ds:DigestValue>
        </ds:Reference>
        <ds:Reference URI="style/gen_default-xml.css">
                <ds:DigestMethod Algorithm="http://www.w3.org/2000/09/xmldsig#sha1"/>
                <ds:DigestValue></ds:DigestValue>
        </ds:Reference>
        <ds:Reference URI="format.js">
                 <ds:DigestMethod Algorithm="http://www.w3.org/2000/09/xmldsig#sha1"/>
                <ds:DigestValue></ds:DigestValue>
        </ds:Reference>
        <ds:Reference URI="index.xml">
                <ds:DigestMethod Algorithm="http://www.w3.org/2000/09/xmldsig#sha1"/>
                <ds:DigestValue></ds:DigestValue>
        </ds:Reference>
```

FIG. 13 cont.

```xml
<ds:Reference URI="style/gen_default.css">
        <ds:DigestMethod Algorithm="http://www.w3.org/2000/09/xmldsig#sha1"/>
        <ds:DigestValue></ds:DigestValue>
    </ds:Reference>
    <ds:Reference URI="thanks.html">
        <ds:DigestMethod Algorithm="http://www.w3.org/2000/09/xmldsig#sha1"/>
        <ds:DigestValue></ds:DigestValue>
    </ds:Reference>
    <ds:Reference URI="loan3.xhtml">
        <ds:DigestMethod Algorithm="http://www.w3.org/2000/09/xmldsig#sha1"/>
        <ds:DigestValue></ds:DigestValue>
    </ds:Reference>
    <ds:Reference URI="META-INF/manifest.xml">
        <ds:DigestMethod Algorithm="http://www.w3.org/2000/09/xmldsig#sha1"/>
        <ds:DigestValue></ds:DigestValue>
    </ds:Reference>
    </ds:SignedInfo>
    <ds:SignatureValue></ds:SignatureValue>
    </ds:Signature>
</LoanRecord>
```

FIG. 14

```
<?xml version="1.0" encoding="UTF-8"?>
<LoanRecord>
        <StartDate>2010-02-05</StartDate>
        <Borrower>
                <Name>John Q. Public</Name>
                <Addr>123 Main St. Tinyville</Addr>                    1400
        </Borrower>
        <Principal currency="USD">10000</Principal>
        <Duration>12</Duration>
        <InterestRate>5</InterestRate>
        <Monthly-Payment>856.07</Monthly-Payment>
        <TotalPayout>10272.84</TotalPayout>
        <ds:Signature xmlns:ds="http://www.w3.org/2000/09/xmldsig#" Id="firstSigner">   ◄——— 1402
                <ds:SignedInfo>
                        <ds:CanonicalizationMethod Algorithm="http://www.w3.org/TR/2001/REC-xml-c14n-20010315"/>
                        <ds:SignatureMethod Algorithm="http://www.w3.org/2000/09/xmldsig#rsa-sha1"/>
                        <ds:Reference URI="">
                        <ds:Transforms> <ds:Transform Algorithm="&filter2;">
                                <filter2:XPath Filter="subtract">
                                //ds:Signature
                                </filter2:XPath>
                        </ds:Transform>
                        </ds:Transforms>
                        <ds:DigestMethod Algorithm="&sha1;"/>
                        <ds:DigestValue></ds:DigestValue>
                        </ds:Reference>
                </ds:SignedInfo>
                <ds:SignatureValue></ds:SignatureValue>
        </ds:Signature>
        <ds:Signature xmlns:ds="http://www.w3.org/2000/09/xmldsig#" Id="secondSigner">   ◄——— 1404
                <ds:SignedInfo>
                        <ds:CanonicalizationMethod Algorithm="http://www.w3.org/TR/2001/REC-xml-c14n-20010315"/>
                        <ds:SignatureMethod Algorithm="http://www.w3.org/2000/09/xmldsig#rsa-sha1"/>
                </ds:SignedInfo>
                <ds:SignatureValue></ds:SignatureValue>
        </ds:Signature>
</LoanRecord>
```

FIG. 15

```
<ds:Signature xmlns:ds="http://www.w3.org/2000/09/xmldsig#" Id="signer">
        <ds:SignedInfo>
                <ds:CanonicalizationMethod Algorithm="http://www.w3.org/TR/2001/REC-xml-c14n-20010315"/>
                <ds:SignatureMethod Algorithm="http://www.w3.org/2000/09/xmldsig#rsa-sha1"/>
        </ds:SignedInfo>
        <ds:SignatureValue></ds:SignatureValue>
        <ds:Object compdoc:resourceFilter="true" xmlns:compdoc="&compDocNS;">
<compdoc:resourceDescriptor filter="subtract">starts-with(., 'attachments/')</compdoc:resourceDescriptor>
        </ds:Object>
</ds:Signature>
```

```
                                                                                    1600
<ds:Signature xmlns:ds="http://www.w3.org/2000/09/xmldsig#" Id="signer">
        <ds:SignedInfo>
                <ds:CanonicalizationMethod Algorithm="http://www.w3.org/TR/2001/REC-xml-c14n-
20010315"/>
                <ds:SignatureMethod Algorithm="http://www.w3.org/2000/09/xmldsig#rsa-sha1"/>
        </ds:SignedInfo>
        <ds:SignatureValue></ds:SignatureValue>
        <ds:Object compdoc:resourceFilter="true" xmlns:compdoc="&compDocNS;">
<compdoc:resourceDescriptor filter="subtract">starts-with(., 'style/')</compdoc:resourceDescriptor>
        </ds:Object>
</ds:Signature>
```
↖ 1602

This setting generates a Reference list as follows:

```
<ds:Signature xmlns:ds="http://www.w3.org/2000/09/xmldsig#" Id="signer">
        <ds:SignedInfo>
                <ds:CanonicalizationMethod Algorithm="http://www.w3.org/TR/2001/REC-xml-c14n-
20010315"/>
                <ds:SignatureMethod Algorithm="http://www.w3.org/2000/09/xmldsig#rsa-sha1"/>
                <ds:Reference URI="">
                        <ds:Transforms>
                        <ds:Transform Algorithm="&filter2;">
                        <filter2:XPath Filter="subtract">        ← 1604
                        here()/ancestor::ds:Signature[1]
                        </filter2:XPath>
                        <filter2:XPath Filter="union">
                        here()/ancestor::ds:Signature[1]/ds:Object[@compdoc:resourceFilter='true']
                        </filter2:XPath>
                        </ds:Transform>
                        </ds:Transforms>
                        <ds:DigestMethod Algorithm="http://www.w3.org/2000/09/xmldsig#sha1"/>
                        <ds:DigestValue></ds:DigestValue>
                </ds:Reference>
                <ds:Reference URI="loan2.xhtml">
                <ds:DigestMethod Algorithm="http://www.w3.org/2000/09/xmldsig#sha1"/>
                <ds:DigestValue></ds:DigestValue>
                </ds:Reference>
                <ds:Reference URI="loan1.xhtml">
                        <ds:DigestMethod Algorithm="http://www.w3.org/2000/09/xmldsig#sha1"/>
                        <ds:DigestValue></ds:DigestValue>
                </ds:Reference>
```

FIG. 16 cont.

```
            <ds:Reference URI="format.js">
                <ds:DigestMethod Algorithm="http://www.w3.org/2000/09/xmldsig#sha1"/>
                <ds:DigestValue></ds:DigestValue>
        </ds:Reference>
        <ds:Reference URI="index.xml">
                <ds:DigestMethod Algorithm="http://www.w3.org/2000/09/xmldsig#sha1"/>
                <ds:DigestValue></ds:DigestValue>
        </ds:Reference>
        <ds:Reference URI="thanks.html">
                <ds:DigestMethod Algorithm="http://www.w3.org/2000/09/xmldsig#sha1"/>
                <ds:DigestValue></ds:DigestValue>
        </ds:Reference>
        <ds:Reference URI="loan3.xhtml">
                <ds:DigestMethod Algorithm="http://www.w3.org/2000/09/xmldsig#sha1"/>
                <ds:DigestValue></ds:DigestValue>
        </ds:Reference>
            <ds:Reference URI="META-INF/manifest.xml">
            <ds:Transforms>
            <ds:Transform Algorithm="&filter2;">
            <filter2:XPath Filter="subtract">
            //manifest:file-entry[starts-with(@manifest:full-path, 'style/')]    ◄────── 1606
            </filter2:XPath>
            </ds:Transform>
            </ds:Transforms>
                    <ds:DigestMethod Algorithm="http://www.w3.org/2000/09/xmldsig#sha1"/>
                    <ds:DigestValue></ds:DigestValue>
            </ds:Reference>
        </ds:SignedInfo>
        <ds:SignatureValue></ds:SignatureValue>
        <ds:Object compdoc:resourceFilter="true" xmlns:compdoc="&compDocNS;">
<compdoc:resourceDescriptor filter="subtract">starts-with(., 'style/')</compdoc:resourceDescriptor>
        </ds:Object>
</ds:Signature>
```

DIGITAL SIGNATURES OF COMPOSITE RESOURCE DOCUMENTS

BACKGROUND

The present invention relates to security of resources in a data processing system.

A "document" may be a convenient metaphor for representing an instance of a web-based business transaction or collaborative business process. The document allows the end-user to save, email and digitally sign a complete digital representation of the end user's interactions with the information system and the full context of those interactions. The document is also a convenient metaphor for web application developers as it gives the developers a single digital asset that can be routed through a business process, encapsulate the full user experience definition for a rich interactive application, and contain all user input, attachments and digital signatures related to a business process transaction. Thus, via the document metaphor, an offline or disconnected form fill experience may be easily offered to end-users. Unresolved challenges exist with digital signatures for documents, which are composite resource documents.

BRIEF SUMMARY

An embodiment of the disclosure can receive a composite resource document containing at least one resource. An updated manifest resource can be obtained. The updated manifest resource can list all resources in the composite resource document. A set of zero or more (0 . . . N) resources can be indicated. Each indicated resource is one that is to be subtracted from the list of resources in the updated manifest resource in order to create a generated signature reference list of identified resources to be signed. A hash token can be generated using the resources identified in the generated signature reference list to form a signature hash token. The signature hash token can be encrypted with a secret key.

An embodiment of the disclosure can receive a composite resource document, containing a set of one or more (1 . . . N) resources, each having a digital signature. An updated manifest resource can be obtained. The updated manifest resource can list all resources in the composite resource document. A hash token can be generated using the resources identified in a generated signature reference list in the digital signature. An encrypted hash token contained within the digital signature can be decrypted using an obtained decryption key to form a signature hash token. Responsive to a comparison of the generated hash token and the signature hash token, a signature validity result can generated, which indicates whether the signatures of the composite resource document are valid or not.

BRIEF DESCRIPTION OF THE SEVERAL VIEWS OF THE DRAWINGS

FIG. 9 is a code snippet example of a manifest, in accordance with embodiments of the disclosure;

FIG. 10 is a code snippet example of the XML data in a composite resource document template, in accordance with various embodiments of the disclosure;

FIG. 11 is a code snippet example of the XML data in a filled composite resource document of FIG. 10, in accordance with various embodiments of the disclosure;

FIG. 12 is a code snippet example containing a composite resource document signature, in accordance with various embodiments of the disclosure;

FIG. 13 is another code snippet example of a composite resource document signature definition illustrating the reference list generation, in accordance with various embodiments of the disclosure;

FIG. 14 is a code snippet example of a composite resource document definition having multiple signers and illustrating a means of specifying the transformed resources, in accordance with various embodiments of the disclosure;

FIG. 15 is a code snippet example of specifying a pattern to control reference generation, in accordance with various embodiments of the disclosure;

FIG. 16 is a code snippet example of filtering specific resources from the generated signature reference list, in accordance with various embodiments of the disclosure;

DETAILED DESCRIPTION

Figure 3:
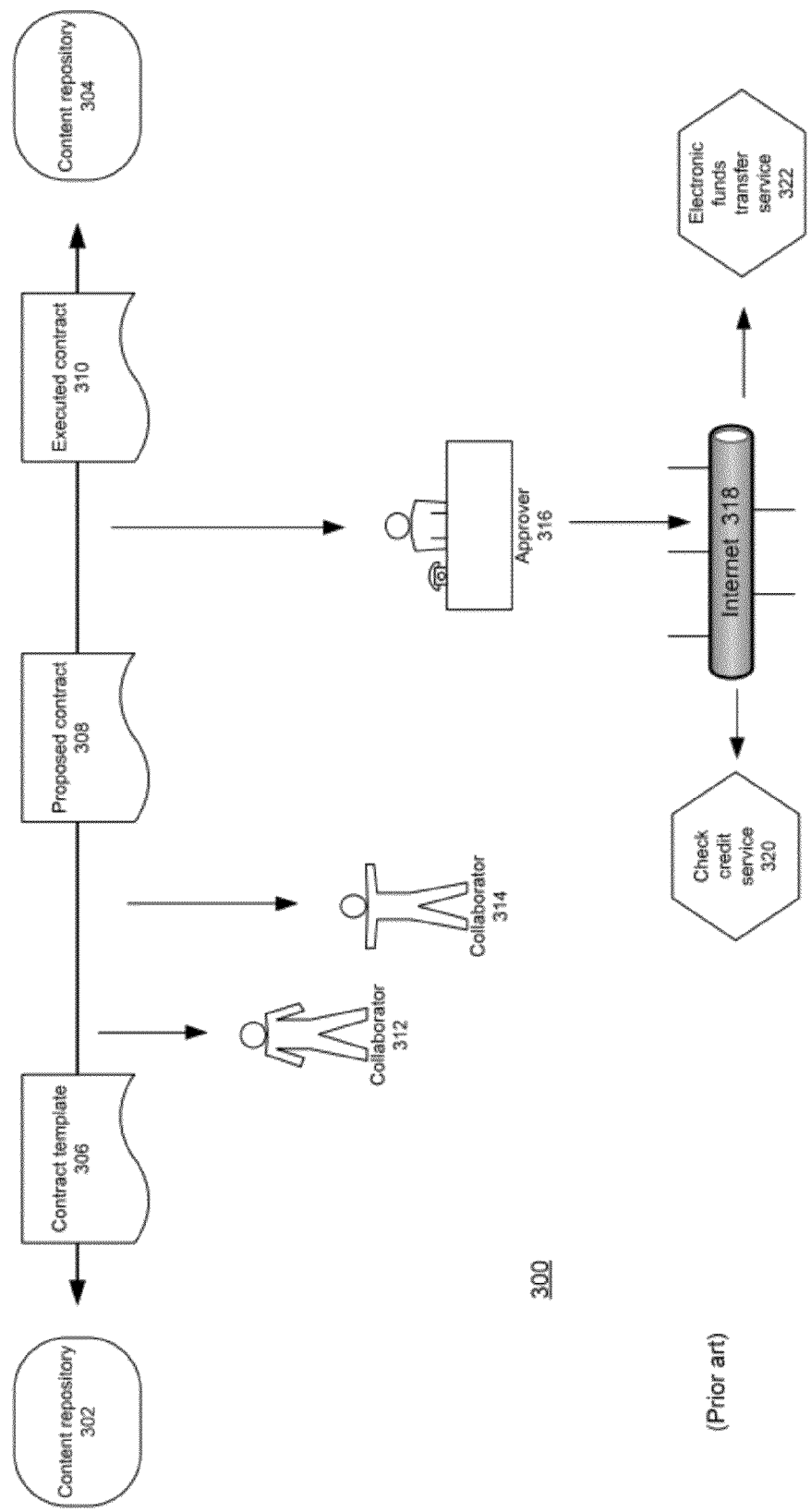
FIG. 3 (Prior Art) is a block diagram of a model of an interactive document flow.

Unresolved challenges exist with digital signatures for documents, which are composite resource documents, as will be detailed herein. FIG. 3 (Prior Art) shows a model of an interactive document flowing through a business process 300. The interactive document is provisioned to the various collaborators, such as collaborator 312 and collaborator 314. This enables the collaborators 312 and 314 to provide their input into the document using content repository 302. Contract template 306 can be used to create proposed contract 308. Proposed contracts may be reviewed and approved by approver 316 communicating through a network such as Internet 318 using check credit service 320 and electronic funds transfer service 322 to generate executed contract 310. Executed contract 310 may be stored in repository 304.

Figure 4:
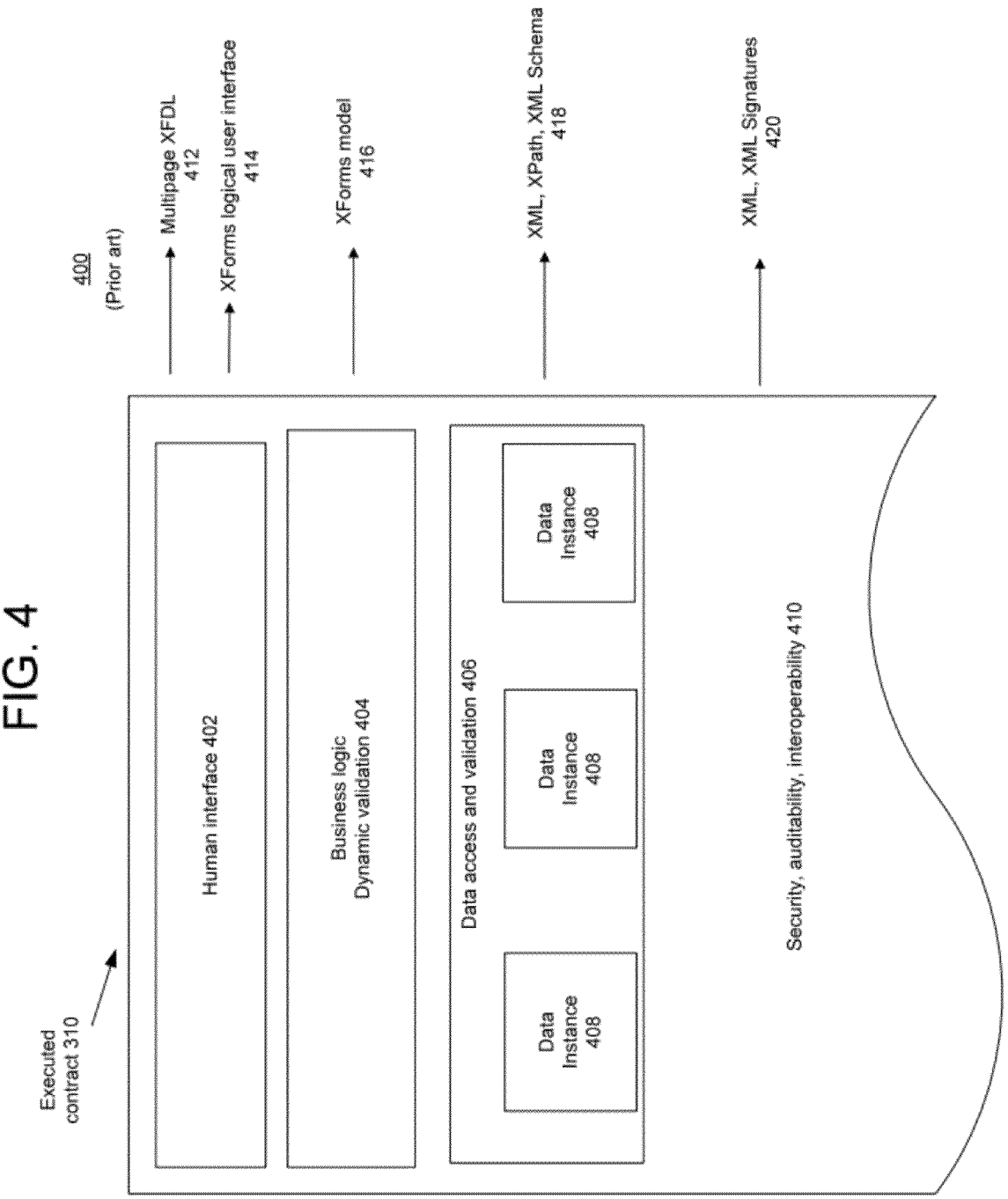
FIG. 4 (Prior Art) is a block diagram of a stratified layering of the interactive document of FIG. 3.

With reference to FIG. 4 a logical layering of an interactive document is presented. In essence, the "interactive document" represents a web application as well as the experience of the web application by a particular user or set of users. The documents, such as executed contract 310, tend to be organized into several logical layers 400 typically comprising data layer, a business rule layer, a logical user interface layer, and a presentational layer. Interactive document 400 depicts a logically stratified approach of representing the components of an interactive document within a collaborative business process. Human interface 402 is an example of a logical user interface layer and presentation layer, while business logic and dynamic validation 404 represent a business rule layer.

The data layer, represented by data access and validation 406, represents underlying data often written in extensible markup language (XML) format, addressable by XML Path language (XPath), and intended to conform to an XML schema 418 of back-end transactions an information system is ultimately designed to drive. A goal of the application is the "fill experience" of the data layer. The data layer may include simple items of data, such as data instance 408, entered by the user, like names, dates, numbers, and amounts as well as file attachments and digital signatures. At key points of the business process, the data can be separated from the rest of the document and stored in databases and/or used to drive workflow steps or completed transactions.

Business rules, logical user interface and presentation layer attach to the data layer providing interaction services. For example, a business rule using XML form definition language, XForms Model 416 may make certain parts of the data relevant only when the user is of a certain age, the XForms logical user interface 414 may provide binding mechanisms connecting the data and the business rule metadata to the presentation layer, and the presentation layer may divide the graphical user experience into multiple pages using multi-page XFDL 412. Extensible Forms Description Language (XFDL) is a class of the extensible markup language (XML).

A digital signature over such a document protects the data provided by the user and also protects other layers simultaneously, thereby creating a protected binding between the data and the application context in which that data was collected. The digital signature is supported through security, auditability and interoperability 410 typically using XML and XML signature 420. For example, when the user enters a data value "500", the digital signature protects not just the data value "500" but also the meaning of the data value, whether that data value means "Buy 500 steel beams" or "Sell 500 shares". This application requirement conforms to the W3C XML Signatures standard, which effectively states a conforming application should sign and validate what a user "sees", rather than just the underlying data being collected.

In a collaborative business process, there is a complicating factor for digital signatures. Simple digital signature applications tend to sign a document as a complete, opaque file, colloquially, a "bucket of bits". The signature protects the whole file, and when any modifications are made to the file after the signature is affixed, the digital signature becomes invalid. However in a collaborative business process, there are often steps of workflow performed after a first digital signature is affixed. These workflow steps create additional information pertinent to the full transaction. Since the document is the representation of the full and completed business process transaction, these workflow steps must modify the document, which must be done without invalidating the digital signature.

The W3C XML Signatures standard provides a solution in the form of a digital signature transform. Without use of transforms, a single XML signature is capable of signing any number of URI-addressable resources. Any number of these resources can be binary, so an XML signature can sign XML content as well as non-XML content. A cryptographic hash of each resource is placed into the XML signature, and then a set of resource hashes is hashed and encrypted with private key material of a signer. However, the W3C XML signature standard also allows each resource to be transformed before it is hashed. XML resources in particular can be transformed using XPath Filter 2, which allows portions of the XML resource to be subtracted before the hash is calculated.

A filtering transform can also simply list what is to be signed, but this has less security value since anything not listed could be added to the resource without invalidating the signature. In collaborative business processes, it is a known best practice to use subtraction filters because the expression of what to subtract is also a characterization of what the rest of the business process is allowed to modify after the signature is affixed. Any other additions, changes or deletions not characterized by the subtraction filter would have the desired effect of invalidating the digital signature.

A single XML document may become less tenable over time as application authors create applications with more and more pages while also demanding higher form throughput per server. Known solutions have drawbacks for digitally signing an interactive document, including representing the document as a single XML file, which allows subtraction filtering but has poor performance, and representation of the document as a composite resource, which offers better performance and allows subtraction filtering within each resource but does not allow subtraction filtering of whole resources from the composite resource. The disclosure provides a solution (detailed herein) for digital signatures for composite resource documents, which overcomes at least a portion of the heretofore unresolved challenges with digital signatures for documents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
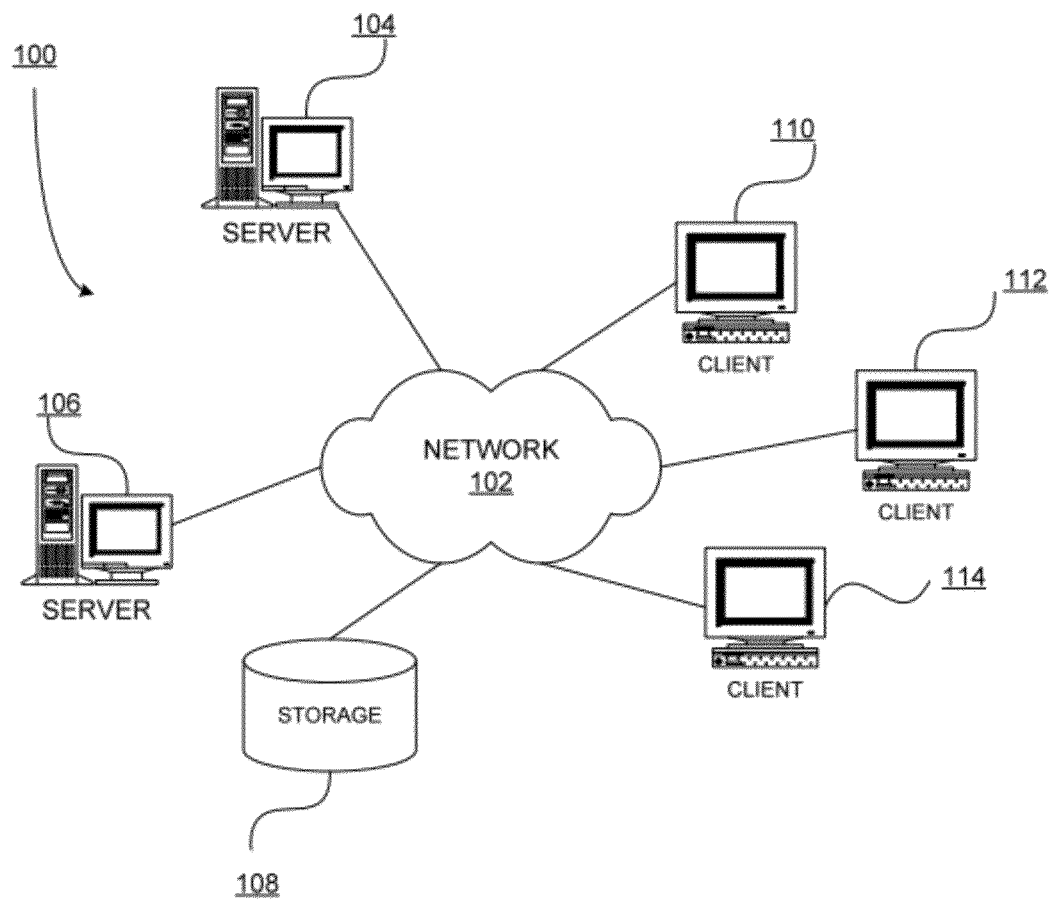
FIG. 1 is a block diagram of a network of data processing systems operable for various embodiments of the disclosure.

Referring to the figures, FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
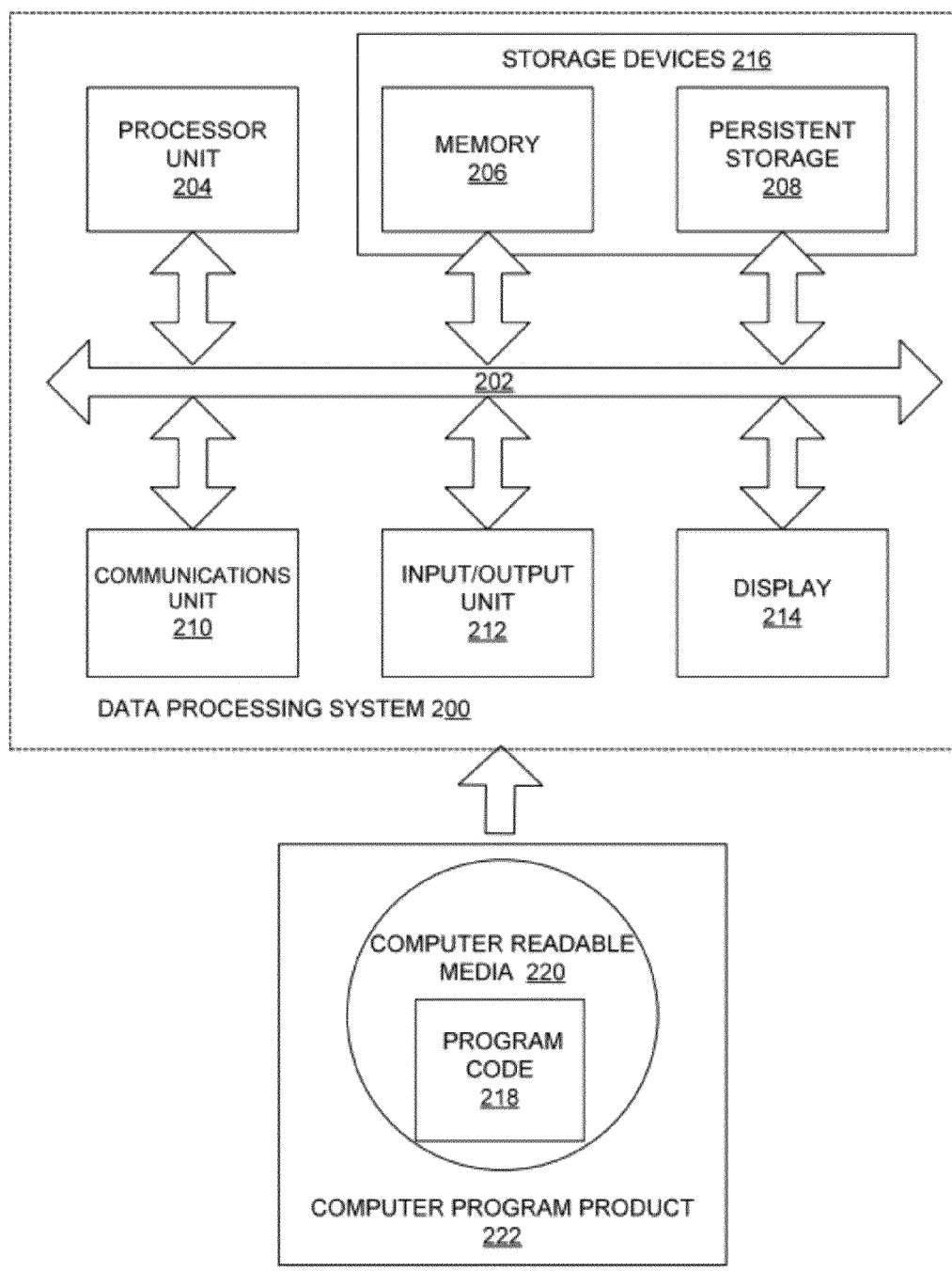
FIG. 2; is a block diagram of a data processing system operable for various embodiments of the disclosure.

Turning now to FIG. 2 a block diagram of a data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, computer executable instructions or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a storage media of persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example, processor unit 204 executes a computer-implemented process for creating a digital signature for a composite resource document receives the composite resource document containing at least one resource from a source including communications unit 210, storage devices 216 or input/output unit 212. Processor unit 204 obtains an updated manifest resource, wherein the updated manifest resource lists all resources in the composite resource document, and indicates zero, one or a plurality of resources to subtract from the list of resources in the updated manifest resource to create a generated signature reference list of identified resources to be signed. Processor unit 204 generates a hash token using the resources identified in the generated signature reference list to form a signature hash token and encrypts the signature hash token with a secret key.

Processor unit 204 further processes the computer-implemented process to validate a digital signature for a composite resource document. Processor unit 204 receives the composite resource document, containing one or a plurality of resources, having a digital signature from a source including communications unit 210, storage devices 216 or input/output unit 212. Processor unit 204 obtains an updated manifest resource, wherein the updated manifest resource lists all resources in the composite resource document. Processor unit 204 generates a hash token using the resources identified in a generated signature reference list in the digital signature to form a generated hash token and decrypts an encrypted hash token contained within the digital signature using an obtained decryption key to form a signature hash token. Processor unit 204 responsive to at least a comparison of the generated hash token and the signature hash token generates a signature validity result.

In an alternative embodiment, program code 218 of FIG. 2 containing the computer-implemented process may be stored within computer readable media 220 as computer program product 222. In another illustrative embodiment, the process for digitally signing a composite resource document may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 5:
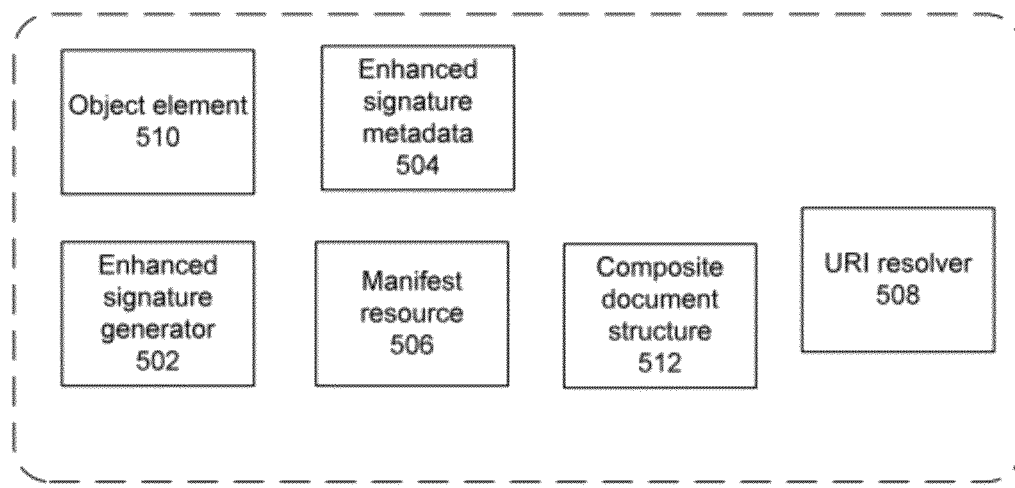
FIG. 5 is a block diagram of composite document system in accordance with one embodiment of the disclosure.

With reference to FIG. 5 a block diagram of composite document system in accordance with one embodiment of the disclosure is presented. Composite document system 500 is an example of a set of components including support of an underlying operating system services typical of a system such as data processing system 200 of FIG. 2.

Composite document system 500 contains a number of interrelated components comprising enhanced signature generator 502, enhanced signature metadata 504, manifest resource 506, URI resolver 508, object element 510 and composite document structure 512.

Enhanced signature generator 502 provides a capability for processing XML statements to generate a digital signature conforming to the applicable XML standards used. The signature generator is enhanced to contain URI resolver 508, which locates resources required during the creation of the digital signature. URI resolver 508 uses universal resource identifiers to obtain specified resources included in the composite document. A URI inherently locates a referenced resource. Including the resolver with the signature generator allows the required resource entries to be found by a typical commercial XML signature processor, whether the resources are located locally within the composite resource document or remotely on a web server. The caller of the digital signal library function provides URI resolvers to a digital signal library. The URI resolver is typically part of (provided by) a programming language, such as Java.

Enhanced signature metadata 504 includes additional items that can be included as signature properties elements. The additional items include end user locale descriptor, local date and time of signing, and UTC date and time of signing.

Manifest resource 506 contains a listing of all resources contained within the composite resource document. Typically, the processor of the composite resource document updates Manifest resource 506 any time a resource is added to or deleted from the composite resource document. However, for the purposes of this disclosure, it is only necessary for Manifest resource 506 to reflect the resources in the composite resource document at the time of generating a digital signature and at the time of validating a digital signature. Object element 510 is a set of elements comprising one or more elements containing special content designed by an author within a signature element of the composite document. In the example embodiment object element 510 contains a specially recognized XML attribute declaring a list of resource descriptors that indicate resources to subtract from the list of reference elements generated into the signed information construct.

Figure 6:
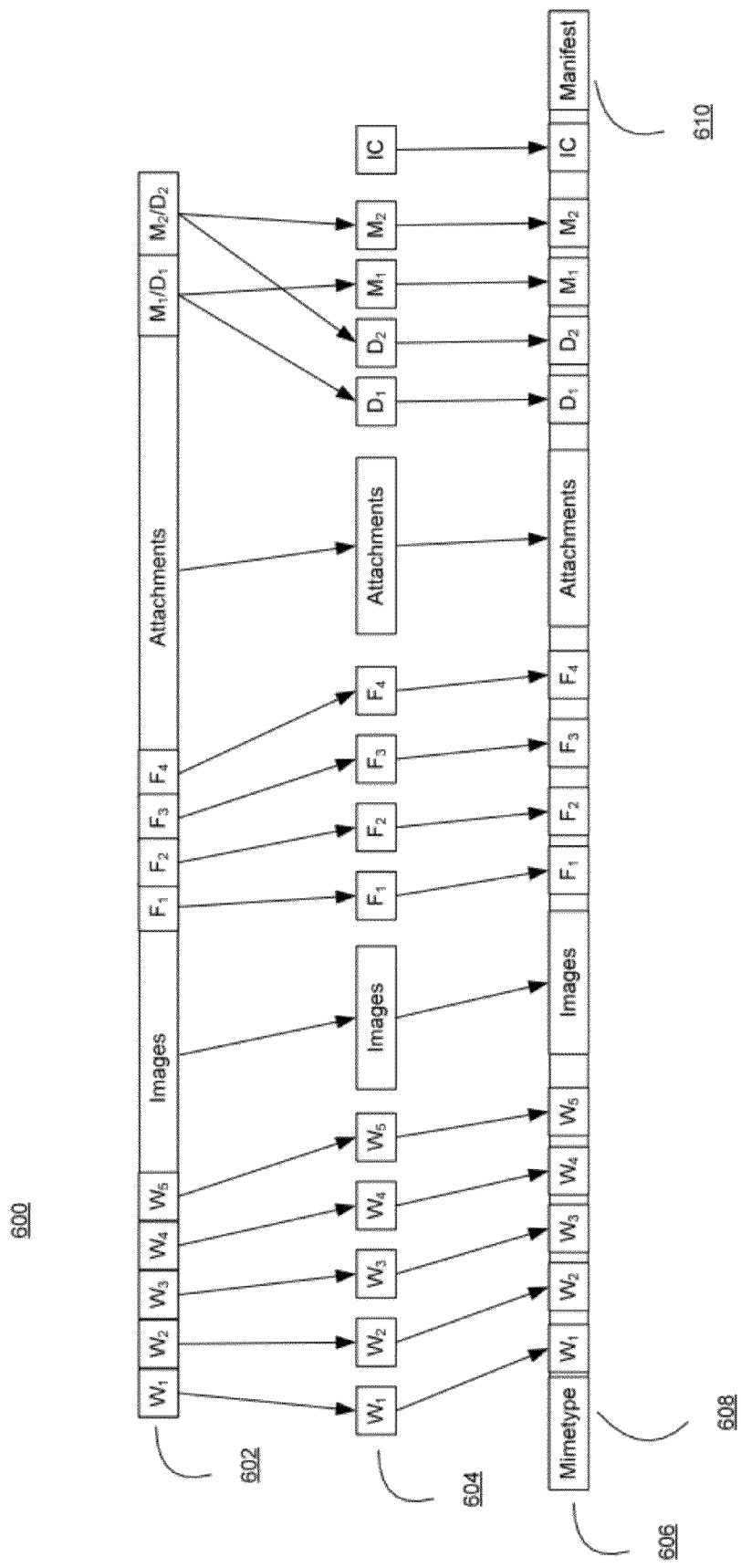
FIG. 6 is a block diagram of logical transition from a monolithic interactive document to a format of a composite document, in accordance with one embodiment of the disclosure.

Composite document structure 512 defines a logical structure for a relative positioning of elements comprising a composite resource document representing an interactive web document format. Typical elements comprise a header, such as a mimetype identifier, resources of wizard pages, images, form pages, data instances, attachments format models, interaction controls and a manifest. FIG. 6 illustrates an example of a composite document structure.

With reference to FIG. 6 a block diagram of logical transition from a monolithic interactive document to a format of a composite document in accordance with one embodiment of the disclosure is presented. Structures 600 represent a logical transition that has evolved over time. The transition does not depict a transform that occurs during processing; rather the representation depicts similarities and differences of the different models. In the figure W represent wizard pages, F represents forms pages, D represent data instances, M represents a forms model and IC represents an interaction controller.

Structure 602 represents a document as a single XML file format using a monolithic model. Structure 604 represents a resource decomposition view of structure 602, with the addition of an optional interaction controller to help manage transitions among the wizard page and form page resources comprising the interactive user interface definition within Structure 602.

Structure 606 represents a compressed archive format of a composite resource document format using the open document format (ODF) packaging format as a compressed archive containing all resources needed for the interactive document. The document format of structure 606 internally contains various components of Structure 604, and hence Structure 602, as separate resources. Structure 606 also contains mimetype 608 information element and a Manifest 610 resource.

The compressed archive format is accessible via an application programming interface that permits additions, deletions and changes to resources and directories, and of course the ability to get the content of resources and directory lists. Typically, such additions, deletions and changes to resources and directories are reflected in the content of the Manifest 610 resource.

Figure 7:
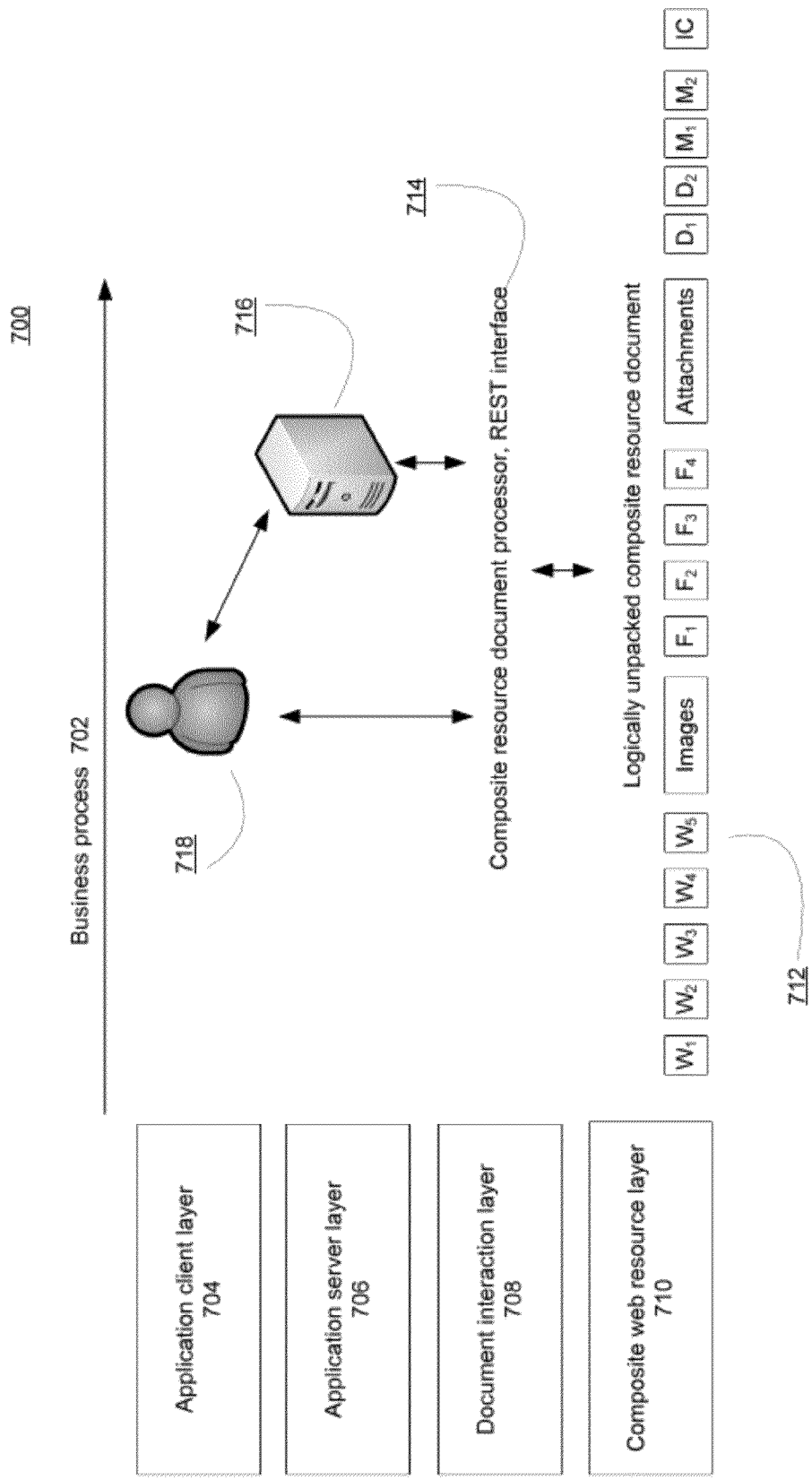
FIG. 7 is a block diagram of a relationship between a composite document, a REST service that makes the composite document available on the web, the web application layer, and the end-user interaction layer in accordance with embodiments of the disclosure.

With reference to FIG. 7 a block diagram of a relationship between a composite document, a REST service that makes the composite document available on the web, the web application layer, and the end-user interaction layer in accordance with embodiments of the disclosure is presented. In an illustrative embodiment, enablement of web-based end-user interaction with composite documents uses a representational state transfer (REST) architected service front-end to the document. The service allows a document template to be copied and become the central artifact of an instance of a collaborative business process. Rather than the whole document being transmitted through the business process, the token of access control to the REST interface of the instantiated document is passed through the business process.

Relationship 700 applies for the duration of business process 702 to provide an association of application client layer 704 with application server layer 706, document interaction layer 708 and composite web resource layer 710. The document interaction layer 708 provides the Composite resource document processor, REST interface 714 for interacting with the logically unpacked composite resource document 712. Two endpoints in the REST interface 714 offer the ability to generate a specified XML digital signature in the composite resource document, and validate a specified XML digital signature in the composite resource document. Composite resource document processor, REST interface 714 provides access to interact with and modify the logically unpacked composite resource document 712 to both server 716 and client 718 logical layers.

Figure 8:
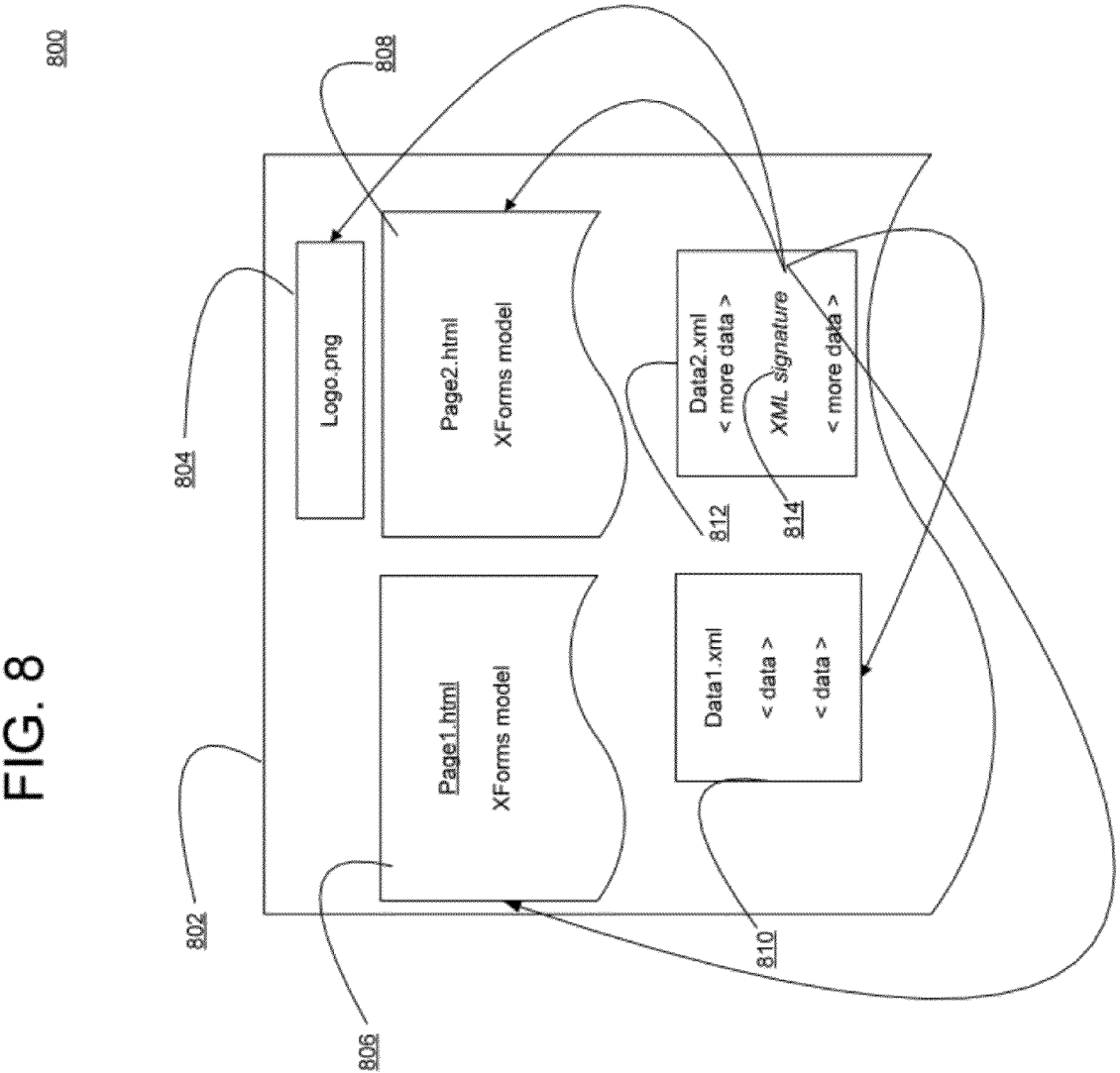
FIG. 8 is a block diagram of a logical location of an XML signature in relation to components of a composite resource document, in accordance with embodiments of the disclosure.

With reference to FIG. 8, a block diagram of a logical location of an XML signature in relation to components of a composite resource document, in accordance with the disclosure is presented. An example implementation uses an Apache XML Signature library, (Apache is a trademark of the Apache Software Foundation), although implementations can also use XML signature facilities built into Java. Logical relationship 800 for composite resource document 802 in the example embodiment provides a URI resolver to the XML signature generator to allow the signature generator to find the resources of the composite resource document. Composite resource document 802 comprises logo 804, forms pages 806 and forms pages 808 with data instance 810 and data instance 812. Data instance 812 further contains XML signature 814.

Prior to generating XML signature 814, markup of the signature appears in the XML data of an XForms instance in the following form:

```
<Signature xmlns="http://www.w3.org/2000/09/xmldsig#">
    <SignedInfo>
        <CanonicalizationMethod Algorithm="http:// www.w3.org/TR/2001/REC-xml-
        c14n-20010315"/>
        <SignatureMethod Algorithm="http:// www.w3.org/2001/04/xmldsig-more#rsa-
        sha256"/>
            <Reference URI?>...</Reference> +
    </SignedInfo>
    <SignatureValue>3H3K9TigFCzVDT4//wbZpAHr0wEAAA==</SignatureValue>
```

```
(<KeyInfo>)?
(<Object Id?>)*
</Signature>
```

Within the SignedInfo element, an XML signature can use Reference elements to list one or more resources to sign or validate. The resources are indicated by a URI, which in the example implementation were resolved by the URI resolver of the disclosure. Logical relationship 800 depicts a logical location of XML signature 814 within the data layer as well as an ability of XML signature 814 to relatively reference resources within the composite resource document 802 regardless of where the composite resource document is stored. An implementation could use a get resource endpoint in the REST service, but the example implementation using the URI resolver directly accesses the composite resource document because the XML signature functionality is behind the REST interface 714 as part of the composite resource document processor 714 (the implementation of the REST interface).

The XML signature generator itself then provides an ability to further filter each resource using a Transforms element within the Reference element. Ultimately, the hash (digest) of the resource is calculated. During signature generation, the hash is stored in the DigestValue element. During validation, the calculated hash is compared to the DigestValue to determine whether the resource has been modified (which would key material of an end user. The XML signature generator in the disclosed process is located on the server as part of the REST service implementation 714. The disclosed process provides a dummy private key to enable the XML signature generator to generate the Signature Value. The SignedInfo generated is returned to the client machine. The SignedInfo is hashed, and the hash is encrypted with the private key of the user. The disclosed process provides a separate REST endpoint within REST interface 714 enabling the setting of the final correct Signature Value into the digital signature. Signature validation requires no similar overload since validation only requires the public key of the signer.

A standard XML signature system provides for signing multiple resources, and is exploited to create basic digital signatures on composite documents. However, digital signatures on composite documents require a subtraction filter mechanism to be secure.

Using a default configuration, an example implementation of the disclosed process overloads the digital signature generation step for the composite document with a preprocessing step that builds a list of reference elements for the SignedInfo of the specified digital signature. In one example, a reference list may be created as follows:

```
{
For each resource R in the composite resource document,
    if R is content.xml or the resource containing the digital signature markup,
      do nothing
    else
    if there is not a Reference element for R, then
      add a Reference element indicating R in the URI attribute.
If the Reference list contains a same document (URI="") Reference SD, then
    Add to SD a Transform that subtracts the digital signature markup
Else
    Add a same document Reference (URI="") that subtracts the digital signature markup.
}
``` invalidate the signature). When generating a signature, once the DigestValue of each resource has been calculated and stored within the Reference element, the hash of the entire containing SignedInfo element (see above) is calculated, encrypted with the signer's private key, base 64 encoded and stored in the Signature Value element. During signature validation, the DigestValue values are checked for equivalence with calculated hashes of the resources at the time of validation, and provided equality is achieved for each resource indicated by a Reference element, the hash of the SignedInfo is obtained and compared for equality with the base 64 decoded, decrypted hash value stored in the Signature Value element at the time of signature generation. On inequality of any DigestValue or the Signature Value with hashes calculated during validation, an invalid result is produced. Otherwise, core validation reports a successful result, and applications are free to perform secondary checks such as key expiry, key revocation, issuer validity, and membership in a trusted key list.

In addition to a custom URI resolver, the disclosed process overloads standard behavior of the XML signature generator by separating the DigestValue calculations from the final encryption of the Signature Value, which requires the private The conditional test for pre-existence of a reference for R (in the fifth textual line above) allows the digital signature markup to express transforms on specific resources within the composite resource document. Any resources not specifically referenced by digital signature markup are added to the digital signature markup and are therefore signed in entirety. Thus, in a default configuration, the SignedInfo is augmented to sign the entire composite resource document except as indicated by pre-existing references and respective possible transforms (which would likely be subtraction transforms for security of the individual resources).

In an example embodiment, content.xml contains only control structures related to managing page navigation and other interactions, so the example prototype does not automatically sign the content.xml resource, although an author of the digital signature markup can sign the content.xml resource or any portion of it by adding a reference element with URI="content.xml". The resource containing the digital signature markup is also omitted from the resources for which the example embodiment generates reference elements. This resource must change as part of generating the digital signature, so the resource must be handled specially as an "enveloped" signature.

One resource within a composite resource document is Manifest 610. Thus, if any resources are added to or deleted from the composite resource document after signing, then the Manifest 610 is changed such that DigestValue of the Reference that protects the Manifest 610 will not match, which will produce a signature validity result of invalid. The actual generated signature ensures no changes can be made to the resources that were present at the time of signing, except as permitted by any transforms expressed in the (signed) Reference elements. Since the Reference elements are signed, the only changes allowed to resources are those that were expressed by the author of the digital signature markup in Reference Transforms that existed at the time of signature generation.

The XML signature standard allows authors to include special content within a signature element using an Object element. The example design uses the capability to provide an override of default behavior of the example implementation. In the example, an Object element bearing a specially recognized XML attribute declares a list of resource descriptors indicating resources to subtract from the list of Reference elements generated into the SignedInfo. The resource descriptors allow wildcard match patterns as in the following example:

```
<Object compdoc:resourceFilter="true" xmlns:compdoc="&compDocNS;">
    <compdoc:resourceDescriptor filter="subtract">attachments/*</compdoc:resourceDescriptor>
</Object>
```

By allowing subtraction of resources that match given resource descriptors, the disclosed mechanism enables the author of the digital signature markup to enable end-users to add or delete specified resources to or from the composite resource document after the signature is affixed.

In the example design, the object is automatically added to the list of Reference elements of the SignedInfo and protected by the digital signature. The inclusion of the special Object causes the process to automatically add a subtraction Transform to the Reference for the Manifest 610 resource enabling addition and deletion of resources matching resource descriptors without invalidating the hash value produced for the Manifest 610 resource when a digital signature is generated.

In addition the example design automatically writes and signs additional information into the digital signature markup before signature generation. Another object element is added to record basic signature metadata in selected SignatureProperties elements. The specific metadata items recorded typically include an end-user (signer) locale descriptor, local date and time of signing and UTC date and time of signing. A reference to this metadata object is automatically added to the SignedInfo to protect the metadata by the digital signature. Illustrative embodiments also complete a KeyInfo element with X509Data, including the X509SubjectName and X509Certificate elements, and a reference to the KeyInfo element is also added to the SignedInfo. The signature metadata and the KeyInfo content help to meet basic security requirements specified by XML Advanced Electronic Signatures (XAdES). Further, since the design of the illustrative embodiments is based on XML signatures, (XAdES) requirements such as the addition of an authenticated timestamp to the signature are inherently supported.

With reference to FIG. 9, a code snippet example of a manifest, in accordance with the disclosure is presented. In terms of signature validation, an important aspect of the design of the example embodiment bases the composite resource document format on ODF packaging, which means that one of the resources in the composite resource document is a manifest listing all resources. Manifest 900 provides a list of all resources within the composite resource document. Resources in manifest 900 such as loan1.xhtml, loan2.xhtml and loan3.xhml provide a step-by-step user interface for collecting information that is placed in the data resource loanInstance.xml. Other files like gen-default.css and format.js contribute to the user interface appearance and run-time behaviors of the composite resource document.

With reference to FIG. 10, a code snippet example of XML data in a composite resource document template, in accordance with various embodiments of the disclosure is presented. In the example, when a document template is first instantiated to drive a specific business process on behalf of a user seeking a loan, the initial content of loanInstance.xml is as shown in the code snippet of FIG. 10.

In code snippet 1000 the initial configuration of the <ds:Signature> element, element 1002, does not include any <Reference> elements. Reference elements are absent because the disclosed design imparts a subtraction semantic on the XML signature Reference list, which means that the resources listed in the manifest will be included automatically at the time of signature generation and checked automatically at the time of validation.

With reference to FIG. 11, a code snippet example of XML Data in a filled composite resource document of FIG. 10, in accordance with various embodiments of the disclosure is presented. Once the user completes the data fill experience using loan*.xhtml, the data will look like code snippet 1100. Data values now populate previously empty template fields 1102.

With reference to FIG. 12, a code snippet example containing a composite resource document signature definition, in accordance with various embodiments of the disclosure is presented. Code snippet 1200 represents a completed document having a set of references, manifest and digital signature using information from FIG. 9, FIG. 10 and FIG. 11.

When a user invokes the Sign operation, as provided in element 1002 of FIG. 10 the disclosed process adds the same document reference for loanInstance.xml, for example element 1202, in which URI=" " enabling the signature being generated to be omitted from itself and adds reference elements for all other resources listed in the manifest, such as reference 1204, reference 1206 and reference 1208. A reference for the manifest.xml file, manifest 1210, is also added.

The digital SignatureValue of element 1212 is also depicted. Element 1212 illustrates the content of the signed info portion of the composite resource document definition before the core digital signature generation operation, which produces the content of the SignatureValue element after the disclosed process generates the Reference elements.

A signature validation operation ensures unwanted file additions or deletions have not occurred by validating the reference to the manifest.xml. An assumption that the ODF package document processor will not load a document when there is a conflict between the manifest and the actual archive content is also made. An alternate implementation may simply check for reference and manifest parity at the time of signature validation.

In another example, a grant application in which two or more grant applicants are expected to fill out respective personal information, attach a copy of a curriculum vitae, digitally sign the document and let the workflow system send the document to the next applicant for completion is presented. A digital signature created by the first user must subtract data file sub-trees corresponding to other applicants and attachments created by other applicants. Other than the two previous exceptions, all other files in the composite resource document describe the user interface, the user experience, or the data or attachments for the signing user, and hence all should be signed.

The arbitrary ability to attach files allows more XHTML pages, CSS files, JS files and so forth to be placed into the composite document resource. Further, since the content.xml file is omitted because the content.xml file contains control structures such as "which xhtml page should be shown first", any newly added files could possibly add new alternative user experiences that could make false claims with respect to what the first signer signed. The possibility of making false claims is prevented by taking the notion of subtraction filtering up to the Reference list level of an XML signature.

With reference to FIG. 13, a code snippet example of a composite resource document signature definition illustrating reference list generation, in accordance with various embodiments of the disclosure is presented. The zero case of subtraction filtering provided by various embodiments of this disclosure is an important change of behavior relative to prior art. By default an XML signature requires an application designer to use Reference elements to list resources to be signed. In a composite resource document, the application designer creates a template and typically decides to include a digital signature feature. However, at run-time, an end-user may need to modify an instance of the template created to drive a business process. An expected end-user operation attaches new files into the composite resource document. Thus, it is not possible at application design time to list as Reference elements all of the resources that must be signed at the run-time moment of signature generation. Instead, it is necessary for the enhanced signature generator of the composite resource document processor to create the list of Reference elements at the time the digital signature is generated.

Therefore, it is important to augment the signing operation with a step that generates a Reference element generator for each resource in the composite resource document, including the manifest. This is the case of subtracting zero of the resources in the composite resource document from the signature. Code snippets of FIG. 10, FIG. 11 and FIG. 12 showed an example of this case in which zero files were subtracted. However, the text only showed markup immediately before the signature generation process and immediately after the full signature generation process. The previous examples did not show the intermediate markup at the point after the digital signature augmentation that generates the Reference list and before the core digital signature generation. FIG. 13 provides an additional markup sample as code snippet 1300. Element 1302 defines a Signature element and element 1304 defines one of the Reference elements automatically generated by various embodiments of the disclosed process.

A set of reference elements, including element 1304 was generated into the SignedInfo, and each has an empty DigestValue element. As well the Signature Value is also empty. After the previously described signing augmentation, further steps can occur before core signature generation including for example, a step that adds a ds: Object to include basic signature properties such as signing time and locale, and another reference to sign. In another example, ds:KeyInfo would be added to store the digital signing certificate and subject name of the signer. A further Reference can be automatically added to sign the KeyInfo, as well. Ultimately, the core digital signature generator is invoked to produce the DigestValue content and the Signature Value content. An example of the final result of enhanced signature generation is shown in the markup example of code snippet 1200 of FIG. 12.

With reference to FIG. 14, a code snippet example of a composite resource document definition having multiple signers and illustrating a means of specifying the transformed resources, in accordance with various embodiments of the disclosure is presented. As described above for FIG. 13, there is value in treating the XML signature reference list as a subtraction filter that subtracts zero elements by default. For example, the Reference list is generated programmatically as an augmentation to the signing operation rather than beforehand by an application designer (the creator of the template of the composite resource document). Thus, the disclosed capability enables implementation of a process to sign the whole document when the document is a composite resource document, in particular when end-users can add more resources to the document than were available in the original document template.

Moreover, the disclosed process adds auto-generated references to whatever Reference elements are already provided, enabling the application designer, the creator of the template for the composite resource document, to elect to sign information in addition to what is generates by the disclosed process. For example, application logic may generate information into a ds: Object in the signature, and the signature may be configured with a reference to sign the ds: Object.

Most importantly, the disclosed process merges the auto-generated Reference element list with a Reference element list in the SignedInfo, effectively adding a Reference for each resource only if it does not already have a pre-existing Reference in the SignedInfo. When an implementation of the disclosed process does add a Reference, the Reference results in signing the whole resource, so the disclosed process is responsive to any Transforms applied to specific resources by an application designer or alternative aspects of the composite resource document processor.

In an example, a "loan" application previously described is designed to satisfy a signer-cosigner scenario. The data in a loanInstance.xml file is represented in code snippet 1400. A first Signature 1402 is provided as well as a second Signature 1404. The signature of second signer 1404 is identical in form to the signature of the earlier examples, but first signer 1402 already contains a Reference to URI=" " that subtracts not only itself (the enveloped signature) but also the signature of the second signer, which must be generated after the first signature is affixed. Hence, when the disclosed process generates Reference elements for first signer 1402, the URI=" " Reference is not generated because it already exists.

With reference to FIG. 15, a code snippet example of specifying a pattern to control reference generation, in accordance with various embodiments of the disclosure is presented. The material in previous example code snippets describe a first step of a subtraction filter, in which a default context of signing everything available is used, rather than signing only what is explicitly listed. Fully enabling subtraction filtering at the composite resource document level allows the application designer to specify by pattern which additional References should not be generated when using the disclosed process.

In previous examples, wildcard regular expression syntax was used, but an XPath expression may also be used. In this example a signature is affixed enabling subsequent additions of files into the composite resource document, but only in a specific directory, such as an attachments directory. The markup of code snippet 1500 provides an example in which element 1502 specifies the explicit pattern for resource subtraction, which in this example matches all resources in an 'attachments' subdirectory into which a user is therefore permitted to add or delete resource attachments.

With reference to FIG. 16, a code snippet example of filtering specific resources from the generated signature reference list thereby suppressing the reference generation for the specific resources using an object of FIG. 15, in accordance with various embodiments of the disclosure is presented. The disclosed process, in response to the object defined in code snippet 1502 of FIG. 15 adds a Reference to the special ds:Object so that the signature signs the filter, amends the manifest.xml Reference to subtract file-entry elements that match the descriptor and suppresses generation of Reference elements for resources that match the descriptor provided.

Another example using code snippet 1600 filters files from a style subdirectory, due to the resource descriptor of element 1602.

The generated URI=" " Reference element receives elements 1604, a subtraction transform for the signature and a union for the resource descriptor object. Reference elements having URI attributes that begin with style/ do not appear in the list. A Reference to manifest.xml, element 1606, receives a subtraction filter that omits file-entry elements matching the description.

Figure 17:
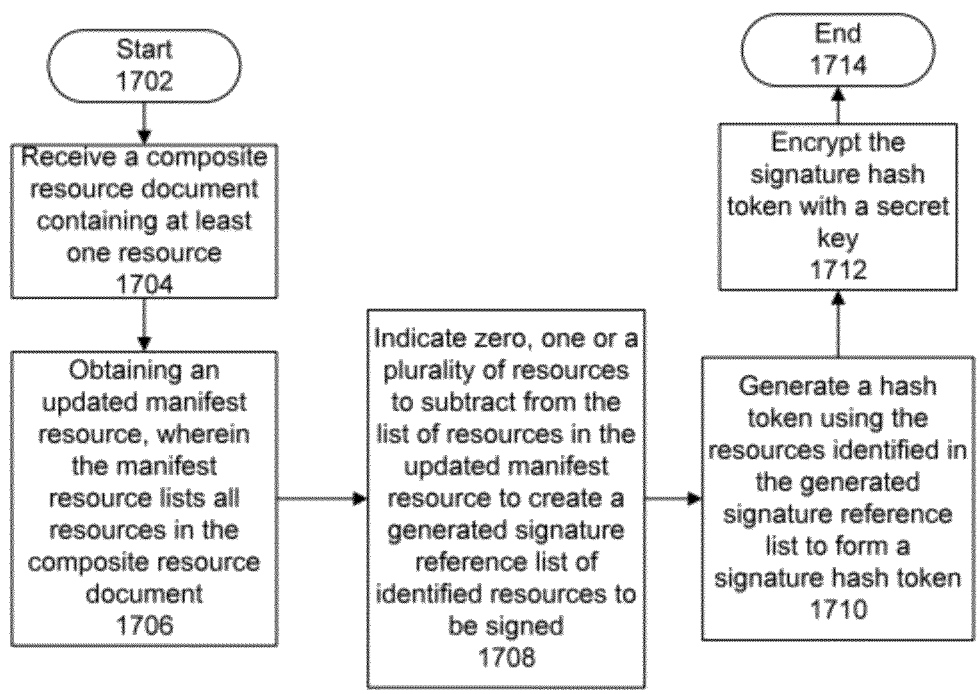
FIG. 17 is a flowchart of a process of generating a digital signature for a composite resource in accordance with various embodiments of the disclosure.

With reference to FIG. 17 a flowchart of a process of generating a digital signature for a composite resource in accordance with the disclosure is presented. Process 1700 is an example of a process using composite document system 500 of FIG. 5.

Process 1700 starts (step 1702) and receives a composite resource document containing at least one resource (step 1704). Process 1700 obtains an updated manifest resource, wherein the manifest resource lists all resources in the composite resource document (step 1706). Process 1700 indicates zero, one or a plurality of resources to subtract from the list of resources in the updated manifest resource to create a generated signature reference list of identified resources to be signed (step 1708). Identify now refers to the resources being signed, and does not include the resources being removed. In an embodiment, generating the generated signature reference list further comprises including a reference that indicates an object, wherein the object declares a list of resource descriptions indicating a list of resources subtracted from the resource list to create the reference list.

Process 1700 generates a hash token using the resources identified in the generated signature reference list to form a signature hash token (step 1710). In an embodiment, generation of the hash token includes selection of one or a plurality of resources in the reference list to form selected transformed resources, wherein remaining resources from the reference list form untransformed resources, and applying digital signature transforms to the selected transformed resources to generate the hash token using the untransformed resources combined with the selected transformed resources. In particular, an embodiment that conforms to the current W3C XML Signatures standard analyzes the Signature SignedInfo element for preexisting Reference elements whose URI attributes indicate resources in the reference list, and the embodiment only generates Reference elements for reference list resources that do not correspond to any of the preexisting Reference elements. Thus, each preexisting Reference element, which may contain a Transforms element, overrides the Reference element that would otherwise be generated for the resource in step 1708, and this resultant list of Reference elements from this process is used in step 1710 to generate the signature hash token.

In an embodiment, generating a signature hash token may further comprise at least one of using a URI resolver to obtain the content of one or a plurality of resources in the reference list and generating the signature hash token using the digest value of at least one of the resources in the reference list. In particular, an embodiment that conforms to the current W3C XML Signatures standard calculates the SignatureValue hash token based on the digest values, rather than the actual content, of all of the resources in the reference list.

Process 1700 encrypts the signature hash token with a secret key to create a digital signature (step 1712) and terminates thereafter (step 1714).

Figure 18:
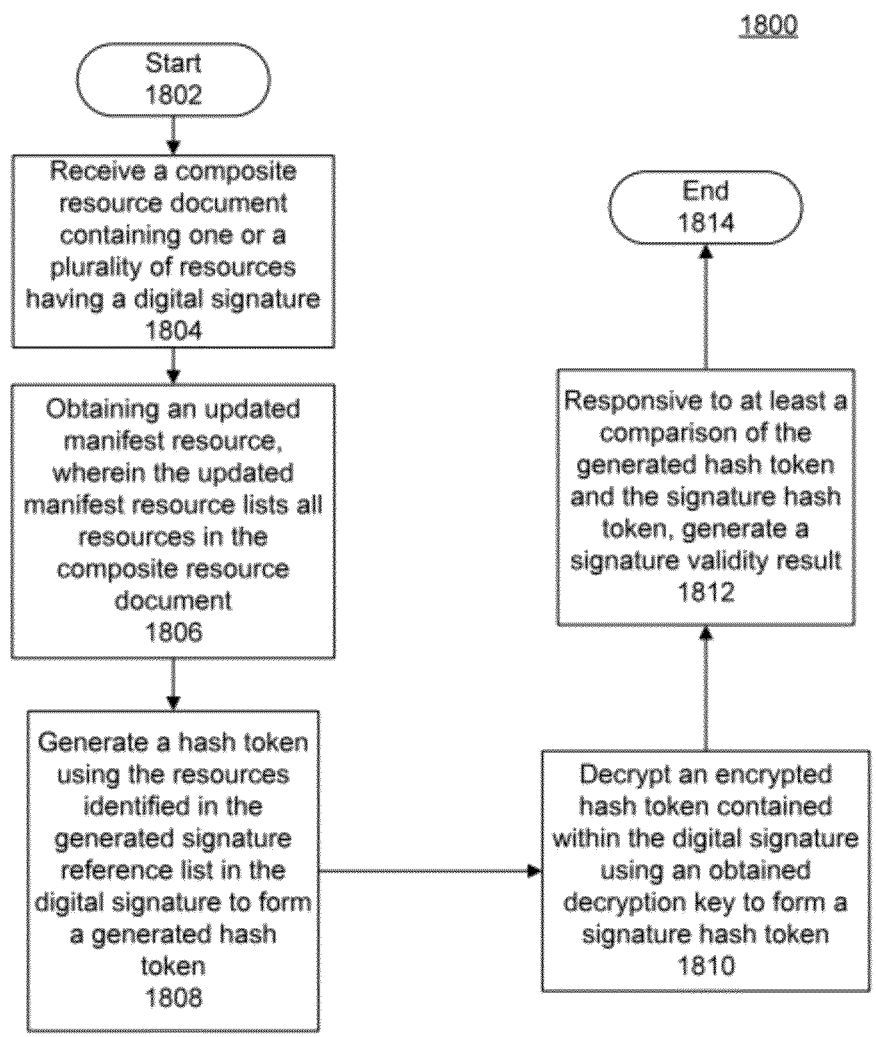
FIG. 18 is a flowchart of a process of validating the digital signature for a composite resource of FIG. 17 in accordance with various embodiments of the disclosure.

With reference to FIG. 18 a flowchart of a process of validating the digital signature for a composite resource of FIG. 17 in accordance with the disclosure is presented. Process 1800 is an example of a process using composite document system 500 of FIG. 5.

Process 1800 starts (step 1802) and receives a composite resource document, containing one or a plurality of resources, having a digital signature (step 1804). Process 1800 obtains an updated manifest resource, wherein the updated manifest resource lists all resources in the composite resource document (step 1806).

Process 1800 generates a hash token using the resources identified in the generated signature reference list in the digital signature to form a generated hash token (step 1808). Process 1800 decrypts an encrypted hash token contained within the digital signature using an obtained decryption key to form a signature hash token (step 1810). Responsive to at least a comparison of the generated hash token and the signature hash token, process 1800 generates a signature validity result (step 1812) and terminates thereafter (step 1814).

Figure 19:
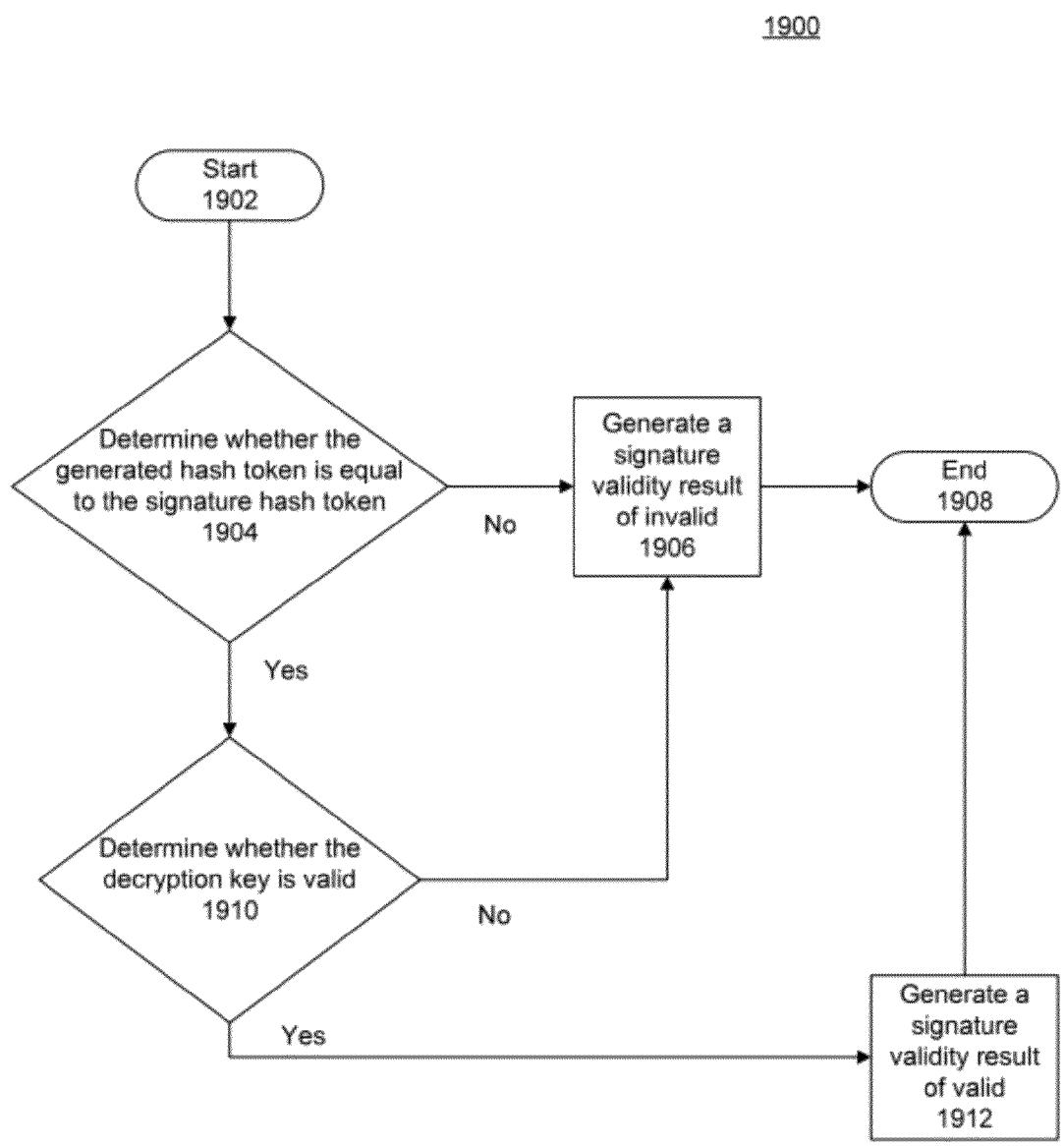
FIG. 19 is a flowchart of a process of generating a signature validity result of FIG. 18 in accordance with various embodiments of the disclosure.

With reference to FIG. 19 a flowchart of a process of generating a signature validity result of FIG. 18 in accordance with the disclosure is presented. Process 1900 is an example of a process comparing a generated resource hash token and a decrypted digital signature hash token in step 1814 and generating a signature validity result in step 1816 of FIG. 18.

Process 1900 begins (step 1902) and determines whether the generated hash token is equal to the signature hash token (step 1904). When a determination is made that the generated hash token is equal to the signature hash token, a "yes" result is obtained. When a determination is made that the generated hash token is not equal to the decrypted digital signature hash token, a "no" result is obtained. When a "no" result is obtained, process 1900 generates an invalid signature validity result (step 1906) and terminates thereafter (step 1908). The determination further comprises determining whether a list of resources from the updated manifest resource is not equal to a list of resources identified in the generated signature reference list in the digital signature. In an embodiment, the list of resources from the updated manifest resource comprises a list of resources from the updated manifest resource less those resources indicated by an object that declares a list of resource descriptions indicating a list of resources subtracted when forming the generated signature reference list.

When a "yes" result is obtained in step 1904, process 1900 determines whether the decryption key is valid (step 1910). When a determination is made that the decryption key is valid, a "yes" result is obtained. When a determination is made that the decryption key is not valid, a "no" result is obtained. A determination of whether the decryption key is valid includes testing validity of the decryption key using zero, one or a plurality of tests including a key expiry test, a key revocation test, a key issuer credential test and a trusted key list test. Responsive to a failure of a decryption key validity test, a signature validity result of invalid is generated.

When a "yes" is obtained in step 1910, process 1900 responds to the overall determination that the generated hash token is equal to the signature hash token and no failures of decryption key validity tests by generating a signature validity result of valid (step 1912) and terminates thereafter (step 1908). The determination further comprises determining whether a list of resources from the updated manifest resource is equal to a list of resources identified in the generated signature reference list in the digital signature. In an embodiment, the list of resources from the updated manifest resource comprises the list of resources from the updated manifest resource less those resources indicated by an object that declares a list of resource descriptions indicating a list of resources subtracted when forming the generated signature reference list. When a "no" result is obtained in step 1910, process 1900 generates a signature validity result of invalid (step 1906) and terminates thereafter (step 1908) as before.

Thus is presented in an embodiment computer-implemented process for creating a digital signature for a composite resource document that provides high security in digital signatures for composite resource documents by providing a resource subtraction filter capability absent from previous solutions for digitally signing multiple resources. The disclosed computer-implemented process receives the composite resource document containing at least one resource, obtains an updated manifest resource, wherein the updated manifest resource lists all resources in the composite resource document, indicates zero, one or a plurality of resources to subtract from the list of resources in the updated manifest resource to create a generated signature reference list of identified resources to be signed, generates a hash token using the resources identified in the generated signature reference list to form a signature hash token and encrypts the signature hash token with a secret key.

Generating the hash token may also include forming the reference list using previously specified reference elements for zero, one or a plurality of the resources, thereby enabling a capability to attach digital signature transforms to the processing of the resources indicated by the previously specified references elements.

Illustrative embodiments of the computer-implemented process further provide a capability of validating a digital signature for a composite resource document. The computer-implemented process further receives the composite resource document, containing one or a plurality of resources, having a digital signature, obtains an updated manifest resource, wherein the updated manifest resource lists all resources in the composite resource document, generates a hash token using the resources identified in a generated signature reference list in the digital signature to form a generated hash token, decrypts an encrypted hash token contained within the digital signature using an obtained decryption key to form a signature hash token and responsive to at least a comparison of the generated hash token and the signature hash token, generates a signature validity result.

Thus, illustrative embodiments disclose a composite resource document using a compressed archive and in which separate resources within the one document represent data records, attachments, pages and additional elements. The composite resource document retains the advantages of single document architecture while eliminating the need to perform XML parsing of the entire archive to obtain pieces needed to provide the page-by-page user experience. Support of multiple references to resources offered by the Worldwide web Consortium (W3C) XML signatures enables W3C XML signatures to be used in conjunction with composite resource documents to implement a digital signing function. However, the subtraction filtering capability is not limited to the processing of single XML resources. For a higher level of defining multiple resources to be simultaneously signed, the W3C XML signatures standard currently provides only a listing capability, specifically the list of resources obtained from the list of Reference elements in the Signature SignedInfo element.

Known prior solutions typically have drawbacks for digitally signing an interactive document including representing a document as a single XML file, which allows subtraction filtering but has poor performance, and representation of the document as a composite resource, which offers better performance but does not allow resource-level subtraction filtering.

A disclosed process combines the notion of a composite resource document with subtraction filtering to achieve a same level of digital signature security on composite resource documents in collaborative business processes while also achieving a significant advancement in performance offered by composite resource documents.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising:
   receiving a composite resource document, containing one or more resources, having a digital signature;
   obtaining an updated manifest resource, wherein the updated manifest resource lists all resources in the composite resource document;
   generating a hash token using the resources identified in a generated signature reference list in the digital signature to form a generated hash token;
   decrypting an encrypted hash token contained within the digital signature using an obtained decryption key to form a signature hash token; and responsive to at least a comparison of the generated hash token and the signature hash token, generating a signature validity result, which comprises:
  responsive to a determination that the generated hash token is not equal to the signature hash token, generating a signature validity result of invalid, wherein the determination further comprises determining whether a list of resources from the updated manifest resource is not equal to a list of resources identified in the generated signature reference list in the digital signature; and
  testing validity of the obtained decryption key using zero, one or a plurality of tests including a key expiry test, a key revocation test, a key issuer credential test and a trusted key list test.

2. The method of claim 1, wherein the composite resource document contains a plurality of resources.

3. The method of claim 1, wherein generating a signature validity result further comprises:
  responsive to a failure of a decryption key validity test, generating a signature validity result of invalid; and
  responsive to a determination that the generated hash token is equal to the signature hash token and absent a failure of the decryption key validity test, generating a signature validity result of valid, wherein the determination further comprises determining whether a list of resources from the updated manifest resource is equal to a list of resources identified in the generated signature reference list in the digital signature.

4. The method of claim 1, wherein generating a hash token using the resources identified in the generated signature reference list further comprises:
  using a URI resolver to obtain the content of one or more resources identified in the generated signature reference list.

5. The method of claim 1, wherein generating a hash token using the resources identified in the generated signature reference list further comprises:
  performing at least one digital signature transform on at least one of the resources identified in the generated signature reference list.

6. The method of claim 1, wherein generating a hash token using the resources identified in the generated signature reference list further comprises:
  generating the hash token using a digest value of at least one of the resources identified in the generated signature reference list.

7. The method of claim 1, wherein the composite resource document is a digital document comprising a plurality of discrete resources, which selectively have a corresponding digital signature unique to that resource.

8. An apparatus comprising:
  a communications fabric;
  a memory connected to the communications fabric, wherein the memory contains computer executable program code;
  a communications unit connected to the communications fabric;
  an input/output unit connected to the communications fabric; and
  a processor unit connected to the communications fabric, wherein the processor unit executes the computer executable program code to direct the apparatus to:
    receive a composite resource document, containing one or more resources, having a digital signature;
    obtain an updated manifest resource, wherein the updated manifest resource lists all resources in the composite resource document;
    generate a hash token using the resources identified in a generated signature reference list in the digital signature to form a generated hash token;
    decrypt an encrypted hash token contained within the digital signature using an obtained decryption key to form a signature hash token; and
    responsive to at least a comparison of the generated hash token and the signature hash token, generate a signature validity result, which comprises:
      responsive to a determination that the generated hash token is not equal to the signature hash token, generating a signature validity result of invalid, wherein the determination further comprises determining whether a list of resources from the updated manifest resource is not equal to a list of resources identified in the generated signature reference list in the digital signature; and
      testing validity of the obtained decryption key using zero, one or a plurality of tests including a key expiry test, a key revocation test, a key issuer credential test and a trusted key list test.

9. The apparatus of claim 8, wherein directing the apparatus to generate a hash token using the resources identified in the generated signature reference list further comprises directing the apparatus to:
  generate the hash token using a digest value of at least one of the resources identified in the generated signature reference list.

10. The apparatus of claim 8, wherein the composite resource document is a digital document comprising a plurality of discrete resources, which selectively have a corresponding digital signature unique to that resource.

11. A non-transitory computer readable storage medium having computer usable program code embodied therewith, the computer usable program code comprising:
  computer usable program code configured to:
    receive a composite resource document, containing one or more resources, having a digital signature;
    obtain an updated manifest resource, wherein the updated manifest resource lists all resources in the composite resource document;
    generate a hash token using the resources identified in a generated signature reference list in the digital signature to form a generated hash token;
    decrypt an encrypted hash token contained within the digital signature using an obtained decryption key to form a signature hash token; and
    responsive to at least a comparison of the generated hash token and the signature hash token, generate a signature validity result, which comprises:
      responsive to a determination that the generated hash token is not equal to the signature hash token, generating a signature validity result of invalid, wherein the determination further comprises determining whether a list of resources from the updated manifest resource is not equal to a list of resources identified in the generated signature reference list in the digital signature; and
      testing validity of the obtained decryption key using zero, one or a plurality of tests including a key expiry test, a key revocation test, a key issuer credential test and a trusted key list test.

12. The non-transitory computer readable storage medium of claim 11, wherein the computer usable program code to direct the apparatus to generate a hash token using the resources identified in the generated signature reference list further comprises computer usable program code to:

generate the hash token using a digest value of at least one of the resources identified in the generated signature reference list.

13. The non-transitory computer readable storage medium of claim 11, wherein the composite resource document is a digital document comprising a plurality of discrete resources, which selectively have a corresponding digital signature unique to that resource.

14. A method comprising:

receiving a composite resource document, containing one or more resources, having a digital signature;

obtaining an updated manifest resource, wherein the updated manifest resource lists all resources in the composite resource document;

generating a hash token using the resources identified in a generated signature reference list in the digital signature to form a generated hash token;

decrypting an encrypted hash token contained within the digital signature using an obtained decryption key to form a signature hash token; and responsive to at least a comparison of the generated hash token and the signature hash token, generating a signature validity result, which comprises:

responsive to a determination that the generated hash token is not equal to the signature hash token, generating a signature validity result of invalid, wherein the determination further comprises determining whether a list of resources from the updated manifest resource is not equal to a list of resources identified in the generated signature reference list in the digital signature;

responsive to a failure of a decryption key validity test, generating a signature validity result of invalid; and responsive to a determination that the generated hash token is equal to the signature hash token and absent a failure of the decryption key validity test, generating a signature validity result of valid, wherein the determination further comprises determining whether a list of resources from the updated manifest resource is equal to a list of resources identified in the generated signature reference list in the digital signature.

15. The method of claim 14, wherein the composite resource document contains a plurality of resources.

16. The method of claim 14, wherein generating a signature validity result further comprises testing validity of the obtained decryption key using zero, one or a plurality of tests including a key expiry test, a key revocation test, a key issuer credential test and a trusted key list test.

17. The method of claim 14, wherein generating a hash token using the resources identified in the generated signature reference list further comprises:

using a URI resolver to obtain the content of one or more resources identified in the generated signature reference list.

18. The method of claim 14, wherein generating a hash token using the resources identified in the generated signature reference list further comprises:

performing at least one digital signature transform on at least one of the resources identified in the generated signature reference list.

19. The method of claim 14, wherein generating a hash token using the resources identified in the generated signature reference list further comprises:

generating the hash token using a digest value of at least one of the resources identified in the generated signature reference list.

20. The method of claim 14, wherein the composite resource document is a digital document comprising a plurality of discrete resources, which selectively have a corresponding digital signature unique to that resource.

* * * * *